(12) United States Patent
Berner et al.

(10) Patent No.: US 11,817,899 B2
(45) Date of Patent: Nov. 14, 2023

(54) OPTICAL WIRELESS COMMUNICATION SYSTEM AND METHOD

(71) Applicant: pureLiFi Limited, Edinburgh (GB)

(72) Inventors: Stephan Berner, Edinburgh (GB);
Mostafa Afgani, Edinburgh (GB);
Harald Haas, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 0 days.

(21) Appl. No.: 17/641,260

(22) PCT Filed: Sep. 9, 2020

(86) PCT No.: PCT/EP2020/075239
§ 371 (c)(1),
(2) Date: Mar. 8, 2022

(87) PCT Pub. No.: WO2021/048231
PCT Pub. Date: Mar. 18, 2021

(65) Prior Publication Data
US 2022/0337314 A1    Oct. 20, 2022

(30) Foreign Application Priority Data
Sep. 9, 2019   (GB) ...................................... 1912938

(51) Int. Cl.
*H04B 10/112*   (2013.01)
*H04B 10/2575*  (2013.01)

(52) U.S. Cl.
CPC ... *H04B 10/1121* (2013.01); *H04B 10/25759* (2013.01)

(58) Field of Classification Search
None
See application file for complete search history.

(56) References Cited

U.S. PATENT DOCUMENTS

| | | | |
|---|---|---|---|
| 10,142,030 B1* | 11/2018 | Blanks | H04L 27/1563 |
| 2006/0056855 A1* | 3/2006 | Nakagawa | G09F 9/33 |
| | | | 398/183 |
| 2016/0149645 A1* | 5/2016 | Liu | H04B 10/116 |
| | | | 398/135 |

FOREIGN PATENT DOCUMENTS

| | | |
|---|---|---|
| CN | 112153186 A | 12/2020 |
| CN | 112152705 B | 3/2022 |
| CN | 112436855 B | 7/2022 |

OTHER PUBLICATIONS

"International Search Report and Written Opinion of the International Searching Authority", International Application No. PCT/EP2020/075239, dated Mar. 22, 2021, 17 pp.

(Continued)

*Primary Examiner* — Darren E Wolf
(74) *Attorney, Agent, or Firm* — Myers Bigel, P.A.

(57) ABSTRACT

An optical wireless communication system and method An optical wireless communication (OWC) system comprises: a multiple input multiple output (MIMO) device configured to provide a plurality of signals each representing a respective data stream; conditioning circuitry configured to receive the plurality of signals from the MIMO device and process the plurality of signals to produce at least one conditioned signal representative of the data stream(s) and suitable for transmission using an OWC transmission device; an OWC transmission device comprising at least one transmitter for transmitting light and configured to be responsive to the at least one conditioned signal to transmit light representative of the data stream(s) using the at least one transmitter.

49 Claims, 20 Drawing Sheets

(56) References Cited

OTHER PUBLICATIONS

"Invitation to Pay Additional Fees and, Where Applicable, Protest Fee", International Application No. PCT/EP2020/075239, dated Feb. 1, 2021, 12 pp.
Deng, Peng, et al., "Real-Time Software-Defined Single-Carrier QAM MIMO Visible Light Communication System", 2016 Integrated Communications Navigation and Surveillance (ICNS), IEEE, Apr. 19, 2016, 11 pp.
Roberts, Rick, "100 Gbps Optical Wireless Tutorial", IEEE Draft; 15-14-0016-00-0THZ-100-GBPS-OPTICAL-WIRELESS-TUTORIAL, IEEE-SA Mentor, vol. 802.15.3d, XP068118525, Retrieved from the Internet: URL:https://mentor.ieee.org/802.15/dcn/14/15-14-0016-00-0thz-100-gbps-optical-wireless-tutorial.pdf, Jan. 19, 2014, 11 pp.
Wang, Yanyan, et al., "Filtered-OFDM for Visible Light Communications", 2018 IEEE/CIC International Conference on Communications in China (ICCC Workshops), Aug. 16, 2018, pp. 227-231.
Examination Report for EP Application No. 20771273.8 dated Jul. 25, 2022, 8 pages.
"Introduction to Wireless LAN Measurements From 802.11a to 802.11ac", https://web.archive.org/web/20180831091109/http://download.ni.com/evaluation/rf/Introduction_to_WLAN_Testing.pdf, Aug. 31, 2018, 42 pages.
Azhar, Ahmad Helmi, et al., "A Gigabit/s Indoor Wireless Transmission Using MIMO-OFDM Visible-Light Communications", IEEE Photonics Technology Letters, vol. 25, No. 2, Jan. 15, 2013, pp. 171-174.
Boryssenko, Anatoliy, et al., "Studies on RF-Optical Dual Mode Wireless Communication Modules", IEEE MTT-S International Microwave Symposium digest. IEEE MTT-S International Microwave Symposium • Jul. 2009, 5 pages.
Bouchei, Olivier, et al., "Hybrid wireless optics (HWO): Building the next-generation home network", 2008 6th International Symposium on Communication Systems, Networks and Digital Signal Processing. 7 pages.
Fath, Thilo, et al., "Performance Comparison of MIMO Techniques for Optical Wireless Communications in Indoor Environments", IEEE Transactions on Communications, vol. 61, No. 2, Feb. 2013, pp. 733-742.
Liao, J., et al., "Integration of LED chip within patch antenna geometry for hybrid FSO/RF communication", Electronics Letters, Sep. 16, 2010, vol. 46, No. 19, 3 pages.

\* cited by examiner

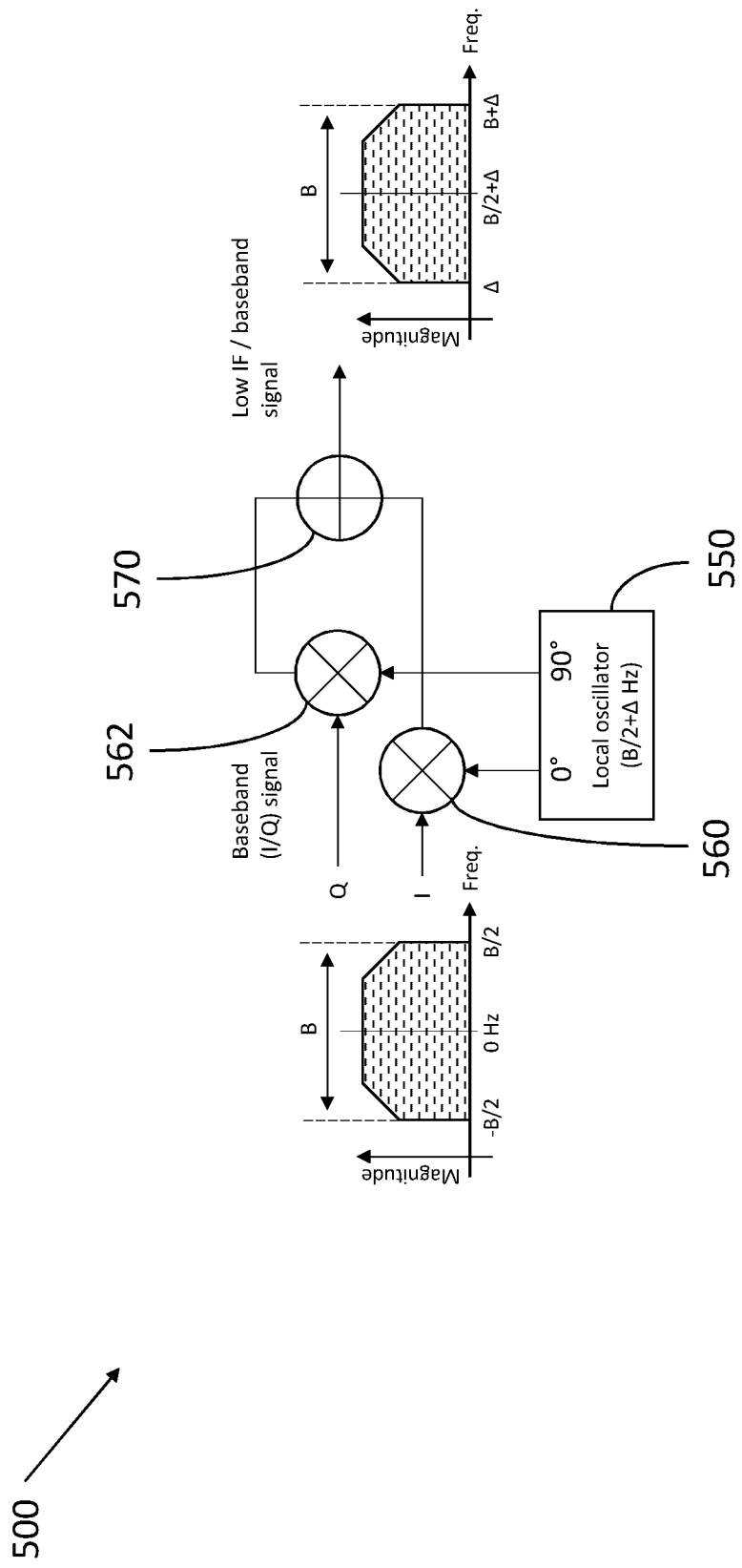

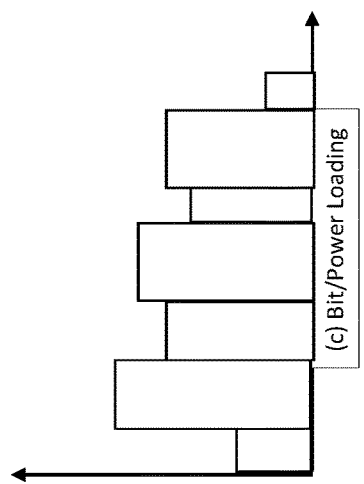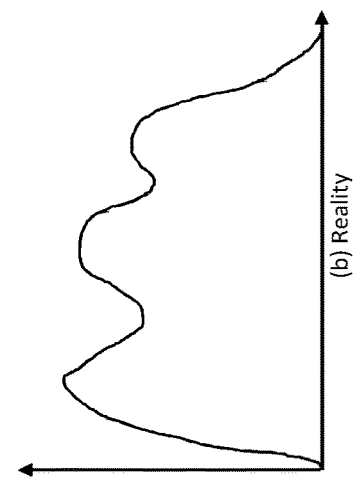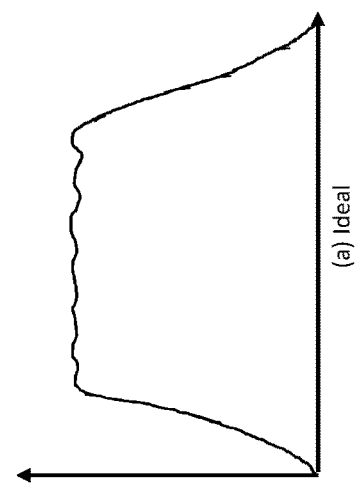
FIG. 17

OPTICAL WIRELESS COMMUNICATION SYSTEM AND METHOD

CROSS-REFERENCE TO RELATED APPLICATIONS

The present application is a 35 U.S.C. § 371 national stage application of PCT Application No. PCT/EP2020/075239, filed Sep. 9, 2020, which itself claims priority to GB Patent Application No. 1912938.6, filed Sep. 9, 2019, the entire contents of both of which are incorporated herein by reference in their entireties. The above-referenced PCT Application was published in the English language as International Publication No. WO 2021/048231 A2 on Mar. 18, 2021.

FIELD

The present invention relates to an optical wireless communication system, for example a LiFi system.

BACKGROUND

The IEEE 802.11 is the most widely used set of standard protocols for wireless computer networking. In 2009, IEEE 802.11n introduced multiple input, multiple output (MIMO) communication using multiple antennas for data streams. Typically, radio frequency (RF) access points (APs) in large order MIMO deployments are typically 4×4 or 8×8. Due to physical size limitations as well as complexity and associated costs RF stations (STAs) have been typically limited to simple MIMO configurations such as 2×2 or 3×3. 802.11 amendments such as 802.11ac can support both single-user and multi-user (MU) MIMO with MU-MIMO allowing an AP to broadcast to multiple clients simultaneously.

Wi-Fi® APs and STAs can utilize MIMO and multi-antenna technologies in various ways. Wi-Fi systems often implement a combination of spatial multiplexing and spatial diversity in MIMO to provide higher data rates and improved robustness.

The use of MIMO in optical wireless communication (OWC) is known, where OWC components may be used in implementations similar to those that exist for RF communication. However due to the different nature of RF and OWC transmission what is possible with an OWC MIMO implementation can differ from potential RF implementations.

SUMMARY

According to a first aspect there is provided an optical wireless communication (OWC) system comprising:
a device, for example a multiple input multiple output (MIMO) device, configured to provide a plurality of signals each representing a respective data stream;
conditioning circuitry configured to receive the plurality of signals from the MIMO device and process the plurality of signals to produce at least one conditioned signal representative of the data stream(s) and suitable for transmission using an OWC transmission device;
at least one OWC transmission device comprising at least one transmitter for transmitting light and configured to be responsive to the at least one conditioned signal to transmit light representative of the data stream(s) using the at least one transmitter.

Thus, for example, MIMO devices, including those designed for RF communication, may be used in improved OWC systems to deliver high data transfer rates relative to RF transmission with a reduced number of transmitters and receivers.

The system may be a transmission or transceiver system configured to transmit data to a further system at a different location, for example, a receiver system or further transceiver system. The system or at least part of the system may be in the form of an apparatus, for example an apparatus provided in a housing.

The OWC transmission device may comprise more than one transmission device.

The signals output or provided by the MIMO device may comprise MIMO device output signals.

The data stream(s) may comprise a plurality of different spatial streams. The different spatial streams may comprise streams intended or suitable for transmission by antennas or other transmitters at different spatial locations, for example antennas or other transmitters at different positions in an antenna array.

The MIMO device may comprise a MIMO baseband device. The MIMO device may comprise a MIMO device intended for use with radio-frequency (RF) transmission circuitry. The MIMO device may comprise a device operating in accordance with the 802.11 standard. The MIMO device may comprise a MIMO baseband device and an RF integrated circuit. The MIMO device may comprise more than one MIMO device.

The system may comprise at least one further device, optionally at least one further MIMO device, wherein the conditioning circuitry may be configured to receive at least one further signal from the further device, and to produce the at least one conditioned signal, optionally a plurality of conditioned signals, from the plurality of signals and the at least one further signal.

The OWC transmission device and/or at least one further OWC transmission device may be configured to be responsive to the at least one conditioned signal to transmit light representative of data stream(s) represented by the signals.

The at least one conditioned signal may comprise at least one baseband signal and/or at least one intermediate frequency between baseband and RF. The light representative of the data stream(s) may comprise at least one baseband signal and may comprise at least one intermediate frequency signal. Alternatively or additionally, the at least one conditioned signal may have a respective frequency and may represent its respective data stream by modulation in a frequency band close to 0 Hz.

The conditioning circuitry may be configured to perform at least one frequency conversion process. The at least one frequency conversion process may comprise a plurality of frequency conversion processes, for example conversion from (or to) RF to (from) baseband, optionally with conversion from (or to) RF to (or from) an intermediate frequency and then from (or to) baseband.

The frequency conversion process may comprise conversion from RF to baseband, optionally with conversion from RF to an intermediate frequency and then to baseband. The frequency conversion process may comprise conversion from baseband to RF, optionally with conversion from baseband to an intermediate frequency and then to RF.

The conditioned signal may be such that the data stream(s) may be representable by light transmitted using at least a single OWC transmitter. The single OWC transmitter may be a wide band OWC transmitter.

The at least one transmitter for transmitting light may comprise a single transmitter for transmitting light.

The OWC transmission device may be configured to be responsive to the at least one conditioned signal to transmit light representative of the data stream or all of the data streams using at least one transmitter.

The data stream(s) may comprise at least a first data stream and a second data stream and the at least one conditioned signal produced by the conditioning circuitry may comprise a conditioned signal that includes a first portion having a first OWC frequency or range of OWC frequencies and at least a second portion having at least a second OWC frequency or range of OWC frequencies, wherein the first portion represents the first data stream and the second portion represents the second data stream(s). An OWC frequency or range of frequencies may be the frequency(ies) used to modulate or encode the light (for example, visible or infra-red light) used for OWC communication.

The first portion and at least a second portion may comprise a first portion, a second portion, and at least one further portion, optionally a plurality of further portions. Each portion may have a respective different OWC frequency or range of frequencies. A portion of a signal may be a part of the signal or may be a sub-signal. Signal(s) may have a plurality of frequency components or a wider range of frequencies and a portion may comprise said signal(s) at one or more of the frequency components or at a narrower range of the frequencies. Each portion may represent a respective different data stream.

The first range of OWC frequencies and the at least second range of OWC frequencies may be non-overlapping.

The first range of OWC frequencies and the at least second range of OWC frequencies may be separated by a further range of OWC frequencies, optionally a guard band.

The first range of OWC frequencies and/or the at least second range of OWC frequencies may include sub-carriers separated by a frequency spacing, and the guard band may have a width substantially equal to an integer multiple of said sub-carrier spacing.

The OWC transmission device may be such that each transmitter has a usable and/or predetermined and/or selected frequency bandwidth for OWC transmission, and the conditioning circuitry may be configured to operate such that said first range of OWC frequencies and the at least second range of OWC frequencies are within said usable bandwidth.

Each of the first range of OWC frequencies and the second range of OWC frequencies may represent or comprise a respective sub-channel within the useable OWC bandwidth of the OWC transmitter device.

The or each transmitter may comprise a light source, optionally a light emitting diode (LED), an array of LEDS, a laser, for example a VCSEL (vertical-cavity surface-emitting laser), a VCSEL array, or a laser diode, or an LEP (light-emitting plasma). The or each transmitter may be configured to transmit infra-red light and/or visible light and/or ultra-violet light and/or any wavelength(s) of light suitable for OWC communication. The OWC communication may comprise LiFi communication. The OWC communication may be full-duplex and/or half-duplex. The OWC transmission device may comprise or form part of an OWC transceiver device comprising OWC transmitter(s) and receiver(s). The or each transmitter may comprise or form part of an OWC transceiver.

The MIMO device may be such that at least one or more of the plurality of signals output by the MIMO device may use a different frequency or frequency range to those used by the OWC transmission device. The MIMO device output signals may be signals having MIMO device output frequency(ies). The MIMO device output frequency(ies) may, for example, be baseband or intermediate frequency or RF frequencies. The MIMO device output frequency(ies) may be different to the OWC frequency(ies). Where the MIMO device generates frequency(ies) that are higher than the desired OWC frequency(ies) the conditioning circuitry may be configured to perform a down-conversion process and where the MIMO device generates frequency(ies) that are lower than the desired OWC frequency(ies) the conditioning circuitry may be configured to perform an up-conversion process.

The plurality of signals from the MIMO device may comprise I and Q components. The conditioning circuitry may be configured to produce conditioned signals representing the I and Q components. The OWC signals representing the I and Q components may be transmitted as a combined signal or separately and/or independently, for example on different channels, at different times, and/or using different transmitters of the transmitter device.

The down-conversion process and/or up-conversion process may produce from the plurality of signals said at least one conditioned signal that has a desired frequency or range of frequencies, preferably the range of frequencies used by the OWC transmission device (e.g. OWC frequency(ies)). The down-conversion (or up-conversion) process may be performed on one or more of the plurality of signals, and may be performed in dependence on the respective MIMO device frequency(ies) of each of the signals.

The conditioning circuitry may be configured to add to or associate with the at least one conditioned signal a clock signal or other timing signal. The clock signal or other timing signal may be included in or associated with a pilot signal. The conditioning circuitry may comprise clock circuitry, optionally reference clock circuitry and optionally may further comprise an associated attenuator.

A microcontroller unit (MCU) or other controller may be utilised to implement estimation and/or correction algorithms that compare the received pilot signal against a local reference clock signal in order to generate adjustment signals, for example for RF up-conversion synthesizers, eliminating the frequency offset between the streams. The correction algorithms can be designed to operate with both continuous and intermittent pilot signals (e.g., by updating the estimator only when a pilot is received).

The plurality of signals provided by the MIMO device (e.g. the MIMO device output signals) and the at least one conditioned signal produced by the conditioning circuitry may comprise electrical signals. The conditioning circuitry may comprise electrical circuitry and may operate in the electrical domain.

The plurality of signals provided by the MIMO device (e.g. the MIMO device output signals) and the at least one conditioned signal produced by the conditioning circuitry may comprise electrical signals. The conditioning circuitry may comprise electrical circuitry and may operate in the electrical domain.

The plurality of signals output from the MIMO device may comprise at least a first signal and a second signal, and optionally at least one further signal. The first signal and the second or further signal(s) may each represent its respective data stream using substantially the same frequency or range of frequencies. Each of the first signal and the second signal may have a respective carrier frequency and may represent its respective data stream by modulation in a frequency band about its carrier frequency. The carrier frequency and/or the frequency band for each of the first and second and/or further signals provided by the MIMO device may be different or they may be substantially the same, and the conditioning circuitry may be configured to shift each of the first and second and/or further signals to baseband or to intermediate frequency(ies) and to represent the first signal using a first range of OWC frequencies and to represent the second signal using a second, different range of OWC frequencies.

The plurality of signals output from the MIMO device may comprise at least a first signal and second signal, and optionally at least one further signal, the first signal and second and/or further signal each representing its data stream using a frequency or range of frequencies characteristic of an RF baseband signal. Alternatively, the first signal and second signal may each represent its data stream using a frequency or range of frequencies characteristic of an RF carrier frequency.

The data streams represented by the first signal and the second and/or further signal may be the same. The data streams represented by the first signal and the second and/or further signal may be different.

Alternatively, the plurality of signals output from the MIMO device may comprise at least a first signal and a second signal, and/or further signal, wherein the first signal and the second and/or further signal each represents its respective data stream using a different MIMO device frequency or range of MIMO device frequencies. The first signal and the second signal may have different carrier frequencies, thereby providing a channel separation between the first signal and the second and/or further signal output from the MIMO device.

The first signal and the second signal may be first and second signals in accordance with an 80+80 MHz channel bandwidth mode. The first signal may have a bandwidth substantially equal to 80 MHz (or 20 MHz, or 40 MHz, or 160 MHz) and a first carrier frequency, the second signal may have a bandwidth substantially equal to 80 MHz (or 20 MHz, or 40 MHz, or 160 MHz) and a second carrier frequency, and the first and carrier frequencies may be different and may be such that the bandwidths of the first and second signals do not overlap.

The conditioning circuitry may be configured to shift each of the first and second and/or further signals to baseband or to intermediate frequency(ies) and to represent the first signal using a first range of OWC frequencies and to represent the second and/or further signal using a second or further, different range of OWC frequencies.

The conditioning circuitry may comprise at least one mixer. The conditioning circuitry may be configured to provide a conversion of the first and second and/or further signals to baseband or to intermediate frequency(ies) that substantially maintains the channel separation of the first signal and the second and/or further signal in the resulting baseband or intermediate frequency conditioned signal.

The conditioning circuitry may be arranged or configured to divide the plurality of signals from the MIMO device (e.g. the MIMO device output signals) into a plurality of OWC groups and to perform a respective conditioning process for each of the groups. Each OWC group may comprise a single one of the conditioned signals. Alternatively, each OWC group preferably comprises a respective plurality of the signals from the MIMO device.

The plurality of down-conversion processes may produce a plurality of conditioned signals, each conditioned signal representing the data stream(s) of the signal(s) of the OWC group corresponding to that conditioned signal.

Each of the conditioned signals of the plurality of conditioned signals may comprise a respective baseband signal and/or intermediate frequency signal.

The conditioning circuitry may be configured to divide the plurality of signals into groups and to condition the signals to produce the plurality of conditioned signals such that each of the conditioned signals is within a predetermined bandwidth.

The at least one transmitter of the OWC transmission device may comprise a plurality of the transmitters and the conditioning circuitry may be configured to provide, for each of the transmitters, a respective different one of the conditioned signals, e.g. so that data stream(s) of the different conditioned signals are transmitted by different ones of the transmitters.

At least one of the plurality of transmitters may be configured to transmit light of different wavelength(s) to at least one other of the transmitters. Thus, different data stream(s) may be transmitted using light of different wavelength(s). Optionally, each of the plurality of transmitters may be configured to transmit light of different wavelength(s) to each other of the plurality of transmitters.

The light transmitted by the or each transmitter (for example, light of a particular wavelength or range of wavelengths transmitted by said transmitter and intended for use in OWC communication) may be modulated by the at least one conditioned signal thereby to represent the data stream(s) corresponding to that at least one conditioned signal.

The system may comprise a controller, for example comprising a processor, for controlling operation of the MIMO device and/or the OWC transmission device and/or the conditioning circuitry.

The OWC system may further comprise an RF transmission device comprising at least one RF antenna.

The MIMO device may be configured to provide at least some of the signals from the MIMO device to the RF transmission device, optionally via the conditioning circuitry, and at least some of the signals from the MIMO device via the conditioning circuitry to the OWC transmission device.

In a second aspect, which may be provided independently, there is provided a combined OWC and RF system comprising:
  a MIMO device configured to provide a plurality of signals (e.g. MIMO device output signals) each representing a respective data stream;
  an OWC transmission device comprising at least one transmitter for transmitting light and configured to be responsive to at least one signal from the MIMO device to transmit light representative of the data stream(s) corresponding to said at least one signal using the at least one transmitter;
  an RF transmission device comprising at least one RF antenna for transmitting RF radiation and configured to be responsive to at least one signal from the MIMO device to transmit RF electromagnetic radiation representative of the data stream(s) corresponding to said at least one signal using the at least one transmitter; wherein
  the MIMO device is configured to provide at least one of the signals (e.g. the MIMO device output signals) to the OWC transmission device for transmittal of the corresponding data stream(s) using light and is further configured to provide at least one of the signals to the RF transmission device for transmittal of the corresponding data stream(s) using RF electromagnetic radiation.

The system may be a transmission or transceiver system configured to transmit data to a further system at a different location, for example, a receiver system or further transceiver system. The system may be in the form of an apparatus, for example an apparatus provided in a housing.

The MIMO device may be configured to provide the signals (e.g. the MIMO device output signals) to the OWC transmission device and/or to the RF transmission device directly, or may be configured to provide the signals to the OWC transmission device and/or to the RF transmission device via at least one further device, for example conditioning circuitry (e.g. such that the signals provided to the OWC transmission device and/or to the RF transmission device comprise conditioned signals).

The MIMO device may be configured to provide at least some, optionally all, of the signals (e.g. the MIMO device output signals) to both the OWC transmission device and to the RF transmission device for transmission. Thereby, redundancy may be provided.

The system may further comprise a controller that is configured to control operation of the MIMO device. The controller may be included in the MIMO device.

The controller may be configured to selectively provide one or more of the signals (e.g. the MIMO device output signals) to the OWC transmission device and to selectively provide one or more of the signals to the RF transmission device.

The controller may be configure to select whether to send a particular one or more of the signals (corresponding to one or more of the data streams) to the OWC transmission device (e.g. for transmission using OWC) and/or to the RF transmission device (e.g. for transmission using RF) in dependence on at least one of: RF and/or OWC signal strength; at least one property of a receiver device that is an intended recipient of the RF or OWC transmissions (e.g. whether the receiver device is RF and/or OWC enabled); required or achieved level of security of the data stream and/or the intended receiver device and/or a user of the receiver device and/or a user of the system and/or a location of the device and/or position or orientation information of the device.

The controller may be configured to switch transmission modes such that at least one, optionally all, of the signals (e.g. the MIMO device output signals) may be sent to the OWC transmission device during a first period of time and may be sent to the RF transmission device during a second period of time. The first period of time may be before the second period of time. The first period of time may be after the second period of time.

The controller may be configured to switch transmission modes in response to at least one transmission condition and/or in dependence on at least one of: RF and/or OWC signal strength; at least one property of a receiver device that is an intended recipient of the RF or OWC transmissions (e.g. whether the receiver device is RF and/or OWC enabled); required or achieved level of security of the data stream and/or the intended receiver device and/or a user of the receiver device and/or a user of the system and/or a location of the device and/or position or orientation information of the device.

The switching of transmission modes may comprise a handover procedure. The switching of transmission modes may be performed in dependence on signal fading of either the OWC or RF transmissions. Handover may revert to a preferred transmission mode on recovery of the preferred signal.

The system may be configured to provide the signals (e.g. the MIMO device output signals) to the OWC transmission device and to the RF transmission device, and/or to transmit signals using the OWC transmission device and the RF transmission device, using a space-time block code (STBC) technique.

The RF transmission device may comprise or form part of an RF front-end. The OWC transmission device may comprise or form part of an OWC front-end.

The RF transmission device may comprise or form part of an RF transceiver device comprising RF transmitter(s) and receiver(s). The or each RF antenna may comprise or form part of an RF transceiver. The or each RF antenna may be configured for both transmission and reception, or for transmission only or for reception only.

The OWC system or the combined OWC and RF system may comprise at least one further OWC transmitter device (e.g. the system may comprise a plurality of OWC transmitter devices). The OWC transmitter device and the further OWC transmitter device may comprise or form part of respective optical front ends.

The OWC transmitter device and the at least one further OWC transmitter may be responsive to the at least one conditioned signal, or at least one of the conditioned signals, to transmit light representative of the data stream(s).

Each of the plurality of OWC transmitter devices may be responsive to the at least one conditioned signal to transmit light representative of the data stream(s).

The system may be configured to selectively provide different of the conditioned signals to different of the OWC transmitter devices.

The system may be configured to selectively provide at least one of the conditioned signals to at least one of the OWC transmitter devices, and a different at least one of the conditioned signals to a different at least one of the OWC transmitter devices.

At least one of the plurality of OWC transmitter devices may provide at least one a different field of view, a different channel, different operating wavelength(s), a different gain or has a different spatial location to at least one other of the transmitter devices.

The OWC transmitter device and the further OWC transmitter may each comprise at least one light transmitter. The at least one light transmitter of the OWC transmitter device and the at least one light transmitter of the further OWC transmitter device may be spatially separated and may have different fields of view (optionally, non-overlapping fields of view) and/or may be orientated to different target areas.

The or each transmitter may comprise a light source, optionally an LED, array of LEDS, a laser, for example a VCSEL (vertical-cavity surface-emitting laser), a VCSEL array, or a laser diode, or an LEP (light-emitting plasma). The or each transmitter may be configured to transmit infra-red light and/or visible light and/or ultra-violet light and/or any wavelength(s) of light suitable for OWC communication. The OWC communication may comprise LiFi communication. The OWC communication may be full-duplex and/or half duplex. The OWC transmission device may comprise or form part of an OWC transceiver device comprising OWC transmitter(s) and receiver(s). The or each transmitter may comprise or form part of an OWC transceiver.

The at least one light transmitter of the OWC transmitter device and the at least one light transmitter of the further OWC transmitter device may use substantially the same frequency of light, or substantially the same range of frequencies of light, for optical wireless communication. Alternatively the at least one light transmitter and further light transmitter may use different light frequencies.

The MIMO device may be configured to provide at least some, optionally all, of the signals (e.g. MIMO device output signals or conditioned signals) to both the OWC transmission device and to the further OWC transmission device for transmission.

The OWC transmission device and the further OWC transmission device may be configured so as to provide OWC communication with different receiver devices and/or for different areas and/or for different fields of view.

The system may further comprise a controller that is configured to control operation of the MIMO device. The controller may be included in the MIMO device.

The controller may be configured to selectively provide one or more of the signals to the OWC transmission device and to selectively provide one or more of the signals to the further OWC transmission device.

The providing of signal(s) to the OWC transmission device and/or to the further OWC transmission device may comprise providing conditioned signal(s) to the OWC transmission device and/or to the further OWC transmission device (e.g. obtained by processing the signals by the conditioning circuitry).

The controller may be configured to select whether to send a particular one or more of the signals (corresponding to one or more of the data streams) to the OWC transmission device or to the further OWC transmission in dependence on at least one of signal strength; at least one property of a receiver device that is an intended recipient of the OWC transmissions (e.g. location of the receiver device or frequency or frequency ranges used by the receiver device for OWC reception or transmission or receiver device access permission level or position or orientation information of the receiver device).

The controller may be configured to switch transmission modes such that at least one, optionally all, of the signals may be sent to the OWC transmission device during a first period of time and may be sent to the further OWC transmission device during a second period of time. The first period of time may be before the second period of time. The first period of time may be after the second period of time.

The controller may be configured to switch transmission modes in response to at least one transmission condition and/or in dependence on at least one of: OWC signal strength; at least one property of a receiver device that is an intended recipient of the OWC transmissions.

The data stream(s) may comprise at least a first data stream and a second data stream, and the at least one conditioned signal produced by the conditioning circuitry may comprise a conditioned signal that includes a first portion having a first frequency or range of frequencies and a second portion having a second frequency or range of frequencies, wherein the first portion represents the first data stream and the second portion represents the second data stream, wherein the conditioning system of the OWC system or the combined OWC and RF system may be configured to apply different power levels and/or at least one different modulation property (for example, a different modulation scheme) and/or at least one coding property (for example, a different coding scheme) for the first and second portions.

The data stream(s) may comprise a plurality of data streams and the conditioning circuitry may be configured to process the signals so that each of the data streams is represented by a different sub-channel (e.g. a different sub-range of frequencies) in the conditioned signal (e.g. a baseband signal having a range of frequencies within or spanning a usable or selected bandwidth of the OWC transmitter device). The sub-channels may together form or be included in a channel. The system may comprise channel shaping circuitry that is configured to shape at least one property of the plurality of sub-channels as a function of sub-channel and/or frequency, for example to apply different power levels and/or at least one different modulation property (for example, a different modulation scheme) and/or at least one coding property (for example, a different coding scheme) to different ones of the sub-channels and/or frequencies. The channel shaping device may be configured to apply different MCS (modulation and coding scheme) values for different sub-channels and/or signals. The channel-shaping circuitry may comprise or be included in the conditioning circuitry.

The channel-shaping circuitry may be configured to provide bit and/or power loading.

The channel-shaping circuitry may be configured to apply different power levels independently of its application of different modulation and/or coding properties.

The channel shaping circuitry may be configured to shape the channel (for example to select at least some different power levels and/or modulation properties and/or coding properties and/or MCS values for different sub-channels and/or signals) in dependence on quality (e.g. signal to noise ratio) or expected quality of each sub-channel, and/or in dependence on link quality. The different sub-channels may be used to communicate with different receiver devices, and the channel shaping may be performed in dependence on properties of the different receiver devices.

The channel shaping circuitry may be configured to shape the channel (for example to select at least some different power levels and/or modulation properties and/or coding properties and/or MCS values for different sub-channels and/or signals) in dynamic or automated fashion and/or in dependence on training and/or feedback (e.g. to optimise signal-to-noise across the whole channel or a selected part of the channel and/or to optimise data throughput and/or to minimise errors).

According to a third aspect there is provided an optical wireless communication (OWC) system comprising:
  an OWC receiver device comprising at least one receiver for receiving light and for generating at least one received OWC signal from the received light representing a plurality of data streams;
  conditioning circuitry configured to receive at least one OWC signal representing the data stream(s) from the OWC receiver device and to process the at least one received OWC signal thereby to produce a plurality of conditioned signals to provide to a multiple input multiple output (MIMO) device;
  the MIMO device configured to receive the plurality of conditioned signals each representing a respective data stream.

The system may be a receiver or transceiver system configured to receive data from a further system at a different location, for example, a transmitter system or further transceiver system. The system may be in the form of an apparatus, for example an apparatus provided in a housing.

The at least one received OWC signal may comprise at least one baseband signal. The light representative of the data stream(s) may comprise at least one baseband signal.

The at least one receiver for receiving light may comprise a single receiver for receiving light. The single OWC receiver may be a single wide band OWC receiver.

The data stream(s) may comprise at least a first data stream and a second data stream and/or at least one further data stream, and the at least one OWC signal received by the conditioning circuitry may comprise a signal that includes a first portion having a first OWC frequency or range of OWC frequencies and at least a second portion having a second and/or further OWC frequency or range of OWC frequencies, wherein the first portion represents the first data stream and the second portion represents the second data stream.

The first range of OWC frequencies and the second range and/or further of OWC frequencies may be non-overlapping.

The first range of OWC frequencies and the second and/or further range of OWC frequencies may be separated by a further range of frequencies, optionally a guard band.

The first range of OWC frequencies and/or the second and/or further range of OWC frequencies may include sub-carriers separated by a frequency spacing, and the guard band may have a width substantially equal to an integer multiple of said sub-carrier spacing.

Each of the first range of OWC frequencies and the second and/or further range of OWC frequencies may represent or comprise a respective sub-channel within the useable OWC bandwidth of the OWC receiver device.

The or each receiver may comprise a light detector, optionally at least one photodiode, array of photodiodes, Si PIN photodiode, silicon photomultiplier (SiPM), single photon avalanche diode (SPAD), Graphene-CMOS high-resolution sensor or avalanche photodiode (APD). The or each receiver may be configured to detect infra-red light and/or visible light and/or ultra-violet light and/or any wavelength(s) of light suitable for OWC communication. The OWC communication may comprise LiFi communication. The OWC receiver device may comprise or form part of an OWC transceiver device comprising OWC transmitter(s) and receiver(s). The or each receiver may comprise or form part of an OWC transceiver.

The conditioning circuitry may be configured to perform an up-conversion (or down-conversion) process to produce from the at least one OWC signal a plurality of conditioned signals that has a desired frequency or range of frequencies, preferably the range of frequencies used by the MIMO device.

The plurality of conditioned signals provided to the MIMO device and the at least one OWC signal received by the conditioning circuitry may comprise electrical signals. The conditioning circuitry may comprise electrical circuitry and may operate in the electrical domain.

The conditioning circuitry may be configured to obtain from the at least one OWC signal or from an associated signal a clock signal or other timing signal, that may be included in or associated with the OWC signal(s). The clock signal or other timing signal may be included in a pilot signal. The conditioning circuitry may comprise a bandpass filter and/or a phase-locked loop (PLL) configured to extract a pilot signal and/or recover the clock or other timing signal. The PLL may comprise a voltage controlled oscillator (VCO) that may be configured to be locked when no input (e.g. no pilot signal) is present. The conditioning circuitry may further comprise estimator circuitry (e.g. a suitably programmed or otherwise configured microcontroller) for estimating and/or correcting a frequency difference between the pilot signal and an oscillator.

The plurality of conditioned signals received by the MIMO device may comprise at least a first signal and a second signal and optionally at least one further signal, the first signal and the second and/or further signal each representing its respective data stream using substantially the same frequency or range of frequencies. Each of the first signal and the second and/or further signal may have a respective carrier frequency and may represent its respective data stream by modulation in a frequency band about its carrier frequency. The carrier frequency and/or the frequency band for each of the first and second and/or further signals provided to the MIMO device may be different or they may be substantially the same, and the conditioning circuitry may be configured to shift each of the first and second and/or further signals from baseband where the first signal is represented using a first range of OWC frequencies and the second and/or further signal is represented using a second and/or further, different range of OWC frequencies.

Alternatively, the plurality of conditioned signals provided to the MIMO device may comprise at least a first signal and a second and/or further signal, wherein the first signal and the second and/or further signal each represents its respective data stream using a different frequency or range of frequencies. The first signal and the second and/or further signal may have different carrier frequencies, thereby providing a channel separation between the first signal and the second and/or further signal.

The first signal and the second signal may be first and second signals in accordance with an 80+80 MHz channel bandwidth mode. The first signal may have a bandwidth substantially equal to 80 MHz (or 20 MHz, or 40 MHz, or 160 MHz) and a first carrier frequency, the second signal may have a bandwidth substantially equal to 80 MHz (or 20 MHz, or 40 MHz, or 160 MHz) and a second carrier frequency, and the first and carrier frequencies may be different and may be such that the bandwidths of the first and second signals do not overlap.

The conditioning circuitry may be configured to shift each of the first and second and/or further signals from the baseband signals and to represent the first signal using a first range of OWC frequencies and to represent the second and/or further signal using a second, different range of OWC frequencies.

The conditioning circuitry may comprise at least one mixer. The conditioning circuitry may be configured to provide an up-conversion from baseband signals to produce the first and second and/or further signals.

The data streams represented by the first signal and the second and/or further signal may be the same. The data streams represented by the first signal and the second and/or further signal may be different.

The conditioning circuitry may receive a plurality of groups of OWC signals and perform a respective conditioning process for each of the groups to provide conditioned signals. Each group may comprise a single one of the conditioned signals. Each group preferably comprises a respective plurality of the conditioned signals to be provided to the MIMO device.

The plurality of conversion processes may produce a plurality of conditioned signals, each conditioned signal representing the data stream(s) of the group corresponding to those conditioned signals.

The at least one receiver of the OWC receiver device may comprise a plurality of the receivers and the conditioning circuitry may be configured to receive from each of the receivers, a respective different baseband signal representing a different group of conditioned signals (for example representing different groups of data streams) to be provided to the MIMO device.

At least one of the plurality of receivers may be configured to receive light of different wavelength(s) to at least one other of the receivers. Thus, different data stream(s) may be received using light of different wavelength(s). Optionally, each of the plurality of receivers may be configured to receive light of different wavelength(s) from that received by each other of the plurality of receivers.

The light received by the or each receiver (for example, light of a particular wavelength or range of wavelengths received by said receiver may be demodulated to obtain the at least one signal thereby to obtain the data stream(s) represented by that at least one signal.

The system may comprise a controller, for example comprising a processor, for controlling operation of the MIMO device and/or the OWC receiver device.

The OWC system may further comprise an RF receiver device comprising at least one antenna.

The MIMO device may be configured to receive at least some of the signals from the RF receiver device and at least some of the signals from the OWC receiver device.

In a fourth aspect, which may be provided independently, there is provided a combined OWC and RF system comprising:
- a MIMO device configured to receive a plurality of signals each representing a respective data stream;
- an OWC receiver device comprising at least one receiver for receiving light and for generating at least one signal representing at least some of the data streams from the received light and providing the generated at least one signal to the MIMO device;
- an RF receiver device comprising at least one RF antenna for receiving RF radiation and for generating at least one signal representing at least some of the data streams from the received RF signals and providing the generated at least one signal to the MIMO device.

The system may be a receiver or transceiver system configured to receive data from a further system at a different location, for example, a transmitter system or further transceiver system. The system may be in the form of an apparatus, for example an apparatus provided in a housing.

The MIMO device may be configured to receive the signals from the OWC receiver device and/or from the RF receiver device directly, or may be configured to receive the signals from the OWC receiver device and/or the RF receiver device via at least one further device, for example conditioning circuitry (e.g. such that at least some of the signals provided to the MIMO device comprise conditioned signals).

The MIMO device may be configured to receive at least some, optionally all, of the signals from both the OWC receiver device and to the RF receiver device. Thereby, redundancy may be provided.

The system may further comprise a controller that is configured to control operation of the MIMO device. The controller may be included in the MIMO device.

The controller may be configured to so that the MIMO device selectively receives one or more of the signals from the OWC receiver device and to selectively receiver one or more of the signals from the RF receiver device.

The RF receiver device may comprise or form part of an RF front-end. The OWC receiver device may comprise or form part of an OWC front-end.

The RF receiver device may comprise or form part of an RF receiver device comprising RF transmitter(s) and receiver(s). The or each RF antenna may comprise or form part of an RF transceiver. The or each RF antenna may be configured for both transmission and reception, or for transmission only or for reception only.

The OWC system or the combined OWC and RF system may comprise at least one further OWC receiver device and/or further RF receiver device (e.g. the system may comprise a plurality of OWC receiver devices). The OWC receiver device and the further OWC receiver device may comprise or form part of respective optical front ends.

The OWC receiver device and the further OWC receiver device may each comprise at least one light receiver. The at least one light receiver of the OWC receiver device and the at least one light receiver of the further OWC receiver device may be spatially separated and may have different fields of view (optionally, non-overlapping fields of view).

The at least one light receiver of the OWC receiver device and the at least one light receiver of the further OWC receiver device may use substantially the same frequency of light, or substantially the same range of frequencies of light, for optical wireless communication.

The MIMO device may be configured to receive at least some, optionally all, of the signals from both the OWC receiver device and the further OWC receiver device for reception.

The OWC receiver device and the further OWC receiver device may be configured so as to provide OWC communication using different receiver devices and/or for different areas and/or for different fields of view.

The system may further comprise a controller that is configured to control operation of the MIMO device. The controller may be included in the MIMO device.

The data stream(s) may comprise at least a first data stream and at least a second and/or further data stream, and the at least one signal received by the conditioning circuitry may comprise a signal that includes a first portion having a first frequency or range of frequencies and a second and/or further portion having a second and/or further frequency or range of frequencies, wherein the first portion represents the first data stream and the second and/or further portion represents the second and/or further data stream, wherein the conditioning system of the OWC system or the combined OWC and RF system may be configured to apply different power levels and/or at least one different modulation property (for example, a different modulation scheme) and/or at least one coding property (for example, a different coding scheme) for the first and second portions.

The at least one received signal may be such that each of the data streams is represented by a different sub-channel (e.g. a different sub-range of frequencies). The system may comprise channel shaping circuitry that is configured to shape at least one property of the plurality of sub-channels as a function of sub-channel and/or frequency, for example to apply at least one different demodulation property (for example, a different demodulation scheme) and/or at least one decoding property (for example, a different decoding scheme) to different ones of the sub-channels.

According to a fifth aspect there is provided an optical wireless communication (OWC) method comprising:
- obtaining a plurality of signals each representing a respective data stream from a MIMO device;
- processing the plurality of signals to produce at least one conditioned signal representative of the data stream(s) and suitable for transmission using an OWC transmission device;
- receiving by an OWC transmission device the at least one conditioned signal and in response transmitting light representative of the data stream(s) using at least one transmitter.

In a sixth aspect, which may be provided independently, there is provided a combined OWC and RF method comprising:

obtaining from a MIMO device a plurality of signals each representing a respective data stream;
providing at least one of the signals from the MIMO device to an OWC transmission device for transmittal of the corresponding data stream(s) using light;
providing at least one of the signals from the MIMO device to an RF transmission device for transmittal of the corresponding data stream(s) using RF electromagnetic radiation.

According to a seventh aspect there is provided an optical wireless communication (OWC) system comprising:
receiving light and generating at least one received signal from the received light;
processing the at least one received signal thereby to produce a plurality of conditioned signals;
providing the plurality of conditioned signals to a MIMO device, each conditioned signal representing a respective data stream.

In an eighth aspect, which may be provided independently, there is provided a combined OWC and RF method comprising:
receiving light and generating at least one received signal from the received light;
receiving RF electromagnetic radiation and generating at least one further received signal from the received RF radiation
processing the at least one received signal thereby to produce a plurality of conditioned signals;
providing the plurality of conditioned signals and the further plurality of received signals to a MIMO device, each signal representing a respective data stream.

In a ninth aspect there is provided a computer program product comprising computer-readable instructions that are executable to perform a method according to any of the fifth to eighth aspects.

In a further aspect, which may be provided independently, there is provided an optical wireless communication (OWC) system comprising:
a plurality of devices configured to provide a plurality of signals each representing a respective data stream;
conditioning circuitry configured to receive the plurality of signals from the devices and process the plurality of signals to produce at least one conditioned signal representative of the data stream(s) and suitable for transmission using at least one OWC transmission device;
at least one OWC transmission device comprising at least one transmitter for transmitting light and configured to be responsive to the at least one conditioned signal to transmit light representative of the data stream(s) using the at least one transmitter.

At least one, optionally all, of the devices may comprise a baseband device. At least one of the devices may comprise a MIMO device. Each device may be configured to communicate using, or to provide signals according to, a respective communication protocol, optionally one or more of LTE, Bluetooth, Wi-Fi, ultrawide band, Wi-Gig or cellular or mm wave protocols. The communication protocol for at least one of the devices may be different to the communication protocol for at least one other of the devices.

Features in any aspect may be applied as features in any other aspect. For example, system features may be provided as method features and vice versa. The systems of any of the first, second, third and fourth aspects may be combined to provide systems including both transmitter and receiver devices as recited. The transmitter and receiver devices may be in the form of transceiver devices.

BRIEF DESCRIPTION OF THE DRAWINGS

Embodiments of the invention are now described, by way of non-limiting examples, and are illustrated in the following figures, in which:

FIG. 5 is a schematic diagram of a system according to an embodiment;
FIG. 17 shows plots providing a comparison of channel performance.

DETAILED DESCRIPTION

Figure 1:
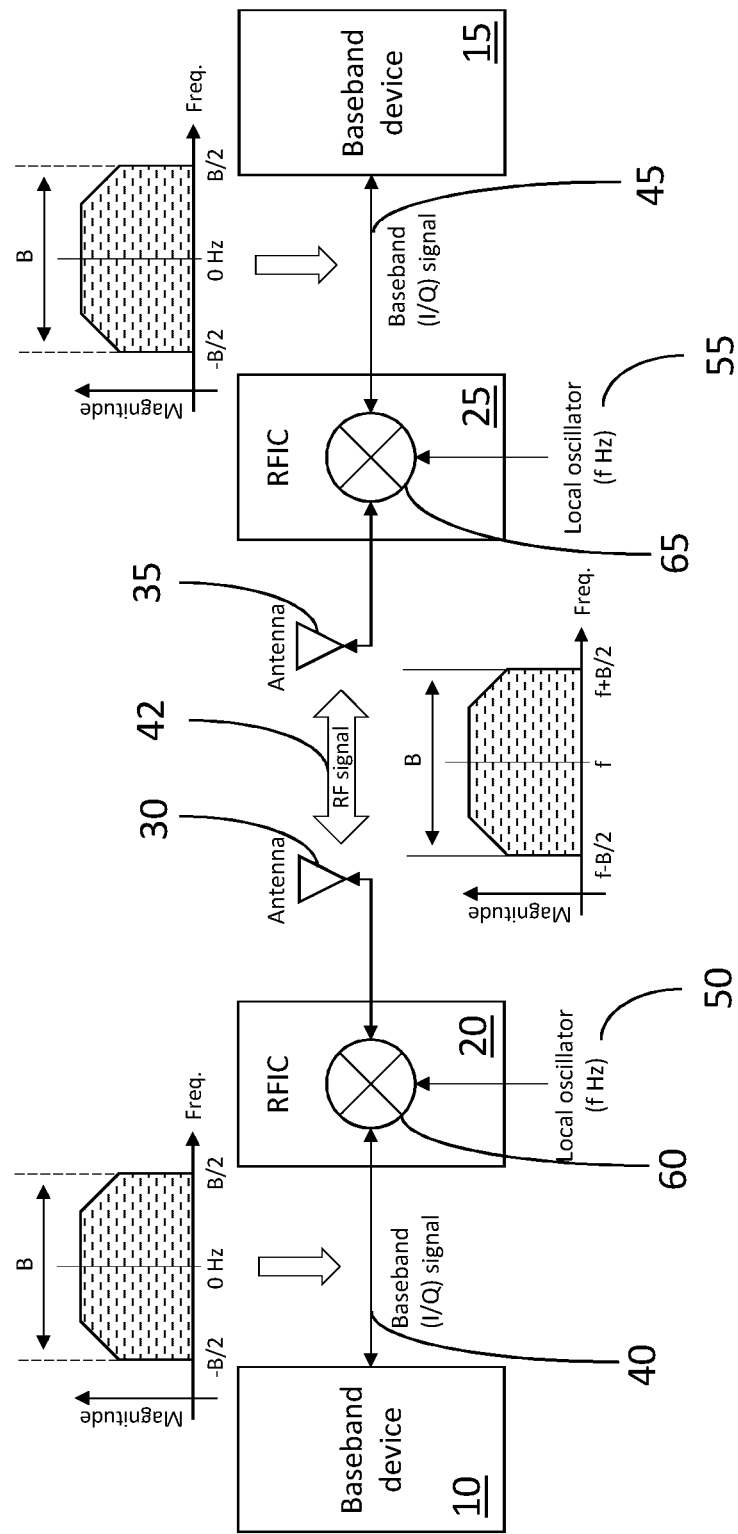
FIG. 1 is a schematic diagram of a Wi-Fi/Radio frequency communication system.

Embodiments are directed to various methods for the use or reuse of MIMO capable baseband devices, or MIMO techniques, for OWC.

In the following description, some terms used in the present document are provided. Some features of Wi-Fi communication systems using MIMO techniques and/or devices are then described. Next, an OWC system is described in overview. Various embodiments using or comprising MIMO techniques and/or devices are then described in more detail.

Beginning with some terms used in the present document, the following description provides some detail of example of how particular terms may be used and/or features that may be represented by such terms.

The term light herein may be used, for example, to refer to electromagnetic waves with wavelengths in a range 1 nm to 2500 nm, which includes ultraviolet, visible light and near infrared wavelengths. Baseband Signal: this may be a signal that occupies a frequency band from 0 Hz (or close to 0 Hz) to some arbitrary cut-off frequency. This is in contrast with intermediate frequency (IF) or RF signals that are centred about a given carrier frequency ($f_c$).

Baseband Device or Integrated Circuit (IC): A communication device (e.g. modem) that may generate modulated baseband signals and/or may demodulate baseband signals. Wi-Fi communication solutions typically consist of a baseband IC connected to an RF integrated circuit RFIC that is responsible for up/down-converting the baseband signal to/from RF (typically 2.4 GHz or 5 GHz). In some highly integrated solutions, the RFIC may be combined with the baseband IC in a single package.

MIMO device: A communication device capable of multiple input, multiple output (MIMO) communication that may comprise either a baseband device or an integrated baseband IC and RFIC.

Precoding: this may comprise all the spatial processing conducted at the transmitter during multi-stream beamforming. Precoding with multiple streams is beneficial in wireless communication system. It can require channel state information (CSI) at the transmitter and receiver.

Spatial Multiplexing: the transmission and reception of multiple independent and separately encoded data 'streams' at the same time. These streams are transmitted/received along the same channel, using multiple antennas or other transmitters/receivers such as optical front ends. The space dimension is reused or multiplexed over a shared medium during transmission of these multiple streams.

Diversity Coding: also known as antenna diversity with spatial/space diversity being a subset of diversity coding. The use of multiple antennas separated physically or otherwise independent from one another to transmit and/or receive the same information. Physical separation may be as little as a wavelength or as much as several miles. Implementing spatial diversity at the transmitter, the receiver or both can achieve higher data rates.

Channel Bonding: Also known as Channel Aggregation. A concept whereby multiple contiguous frequency bands are combined to produce a single, wider communication channel. In 802.11, the basic channel width is 20 MHz and multiples of these may be bonded together to yield 40 MHz, 80 MHz, or 160 MHz channel widths. A special case of non-contiguous channel bonding was introduced in 802.11ac (known as 80+80 bandwidth) whereby two non-contiguous 80 MHz channels are combined.

Maximal ratio combining (MRC): a method of diversity combining for combining acquired signals from a plurality of receiver antennas. MRC combines all signals in a co-phased and/or weighted manner to achieve a high signal-to-noise ratio (SNR). The gain of each channel is made proportional to the root mean square (rms) signal level and inversely proportional to the mean square noise level in said channel.

Space time block coding (STBC): each antenna is configured to transmit a different symbol, or data stream, in time, but each symbol is effectively transmitted multiple times, for example across a number of antennas.

Modulation and coding scheme (MCS): Within a given number of combinations, a given combination of spatial streams, modulation type and coding scheme that offers a different level of transmission rate and resilience against communication channel imperfections/noise compared to other combinations.

Some MIMO techniques and devices are now described in relation to FIGS. 1 to 3B, in relation to Wi-Fi and/or R.F. systems.

FIG. 1 is a schematic diagram illustrating a Wi-Fi communication system, which may be operated in accordance with 802.11 (Wi-Fi) modes of operation. A first baseband device 10 is in communication with a first RFIC 20, and a first baseband I/Q signal 40 can be sent therebetween.

The first RFIC comprises a first mixer 60. The first mixer 60 receives input from a first local oscillator 50. The first mixer 60 is in communication with a first antenna 30. The first antenna 30 is operable to transmit RF signals 42 to a second antenna 35. The first antenna 30 is operable to receive RF signals 42 from the second antenna 35. The second antenna 35 is in communication with a second mixer 65. A second RFIC 25 comprises the second mixer 65. The second mixer 65 receives input from a second local oscillator 55. The second RFIC is in communication with a second baseband device 15 and a second baseband I/Q signal 45 can be sent therebetween.

The state-of-the-art 802.11 (Wi-Fi) protocol supports several operation modes whereby a device may transmit/receive information using one or more antenna elements and one of several channel bandwidths (20 MHz, 40 MHz, 80 MHz, 160 MHz) available. Furthermore, the RF transmission may utilise a carrier frequency ($f_c$) in one of the permitted frequency bands (e.g., 2.4 GHz and 5 GHz) and encode data using a permitted MCS option, for example see http://mcsindex.com.

Typical Wi-Fi solutions consist of two key components aside from the antenna(s): a baseband device 10 and an RFIC 20, for example as illustrated in FIG. 1. The baseband device/IC generates the modulated baseband signal and/or demodulates the received baseband signal. The RFIC is responsible for up/down-converting the baseband signal to/from the RF carrier frequency.

Devices with 2 or more antenna elements may, for example, support the following features or modes of operation (alongside several others):
  Multiple spatial streams
  80+80 channel bandwidth
  MU-MIMO These may be exploited for efficient OWC system implementation either individually or in combination. A brief description for each of these concepts follows.

Multiple Spatial Streams

Figure 2:
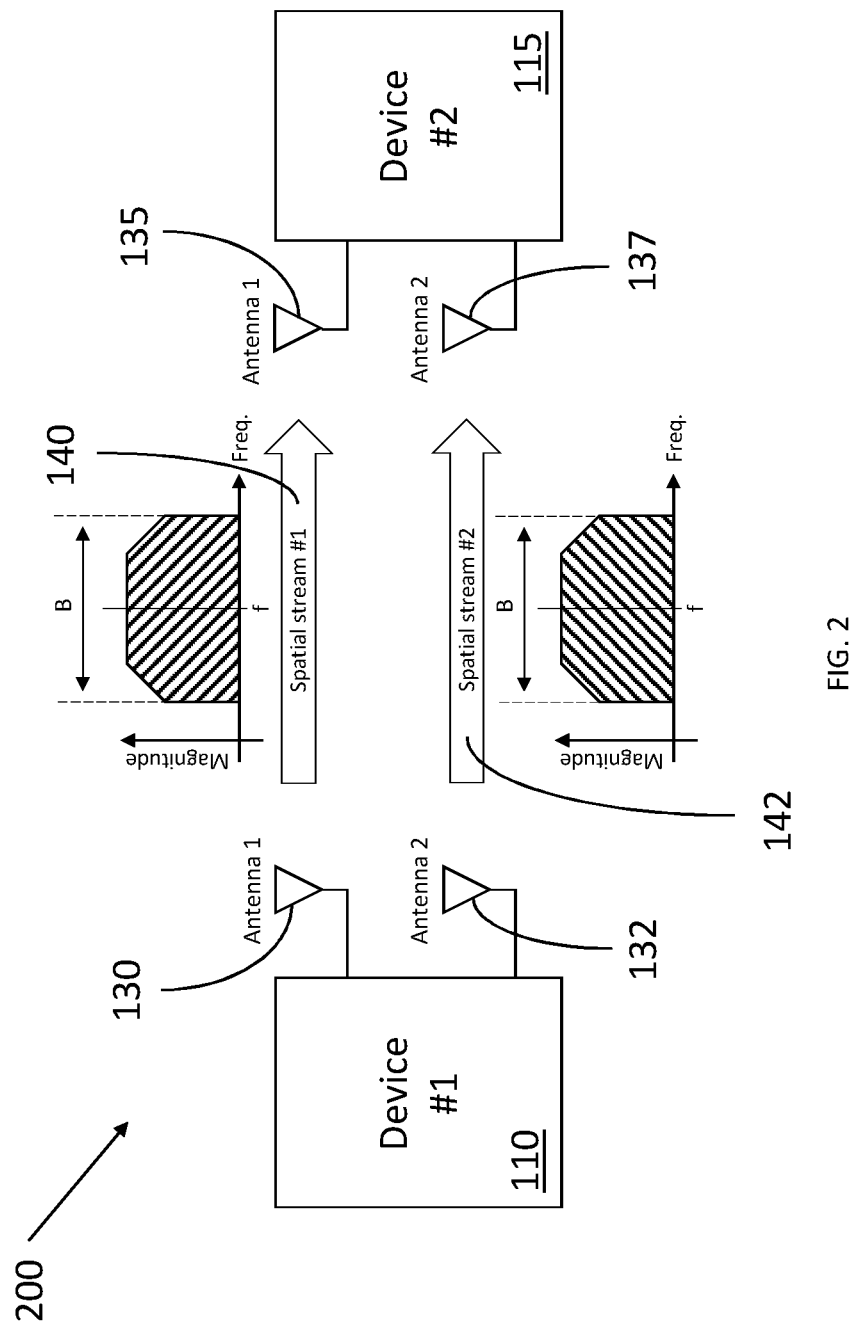
FIG. 2 is a schematic diagram of a Wi-Fi/Radio frequency multiple spatial stream communication system.

FIG. 2 is a schematic diagram illustrating a Wi-Fi communication system operable to transmit and receive multiple streams. For all streams, carrier frequency ($f_c$) is f and the channel bandwidth is B.

A first device 110 is connected to a first antenna 130 and a second antenna 132 of the first device. The second device 115 is connected to a first antenna 135 of the second device and a second antenna 137 of the second device. The first antenna 130 is operable to transmit and receive a first spatial stream 140. The first antenna 135 of the second device is also operable to transmit and receive the first spatial stream 140. The second antenna 132 of the first device is operable to transmit and receive a second spatial stream 142. The second antenna 137 of the second device is also operable to transmit and receive the second spatial stream 142.

The multitude of transmit and receive antennas may allow (channel conditions permitting) multiple, independent data streams to be communicated simultaneously using the same channel (frequency band) between two MIMO devices. Each independent data stream is then known as a spatial stream.

80+80 Channel Bandwidth

Figure 3A:
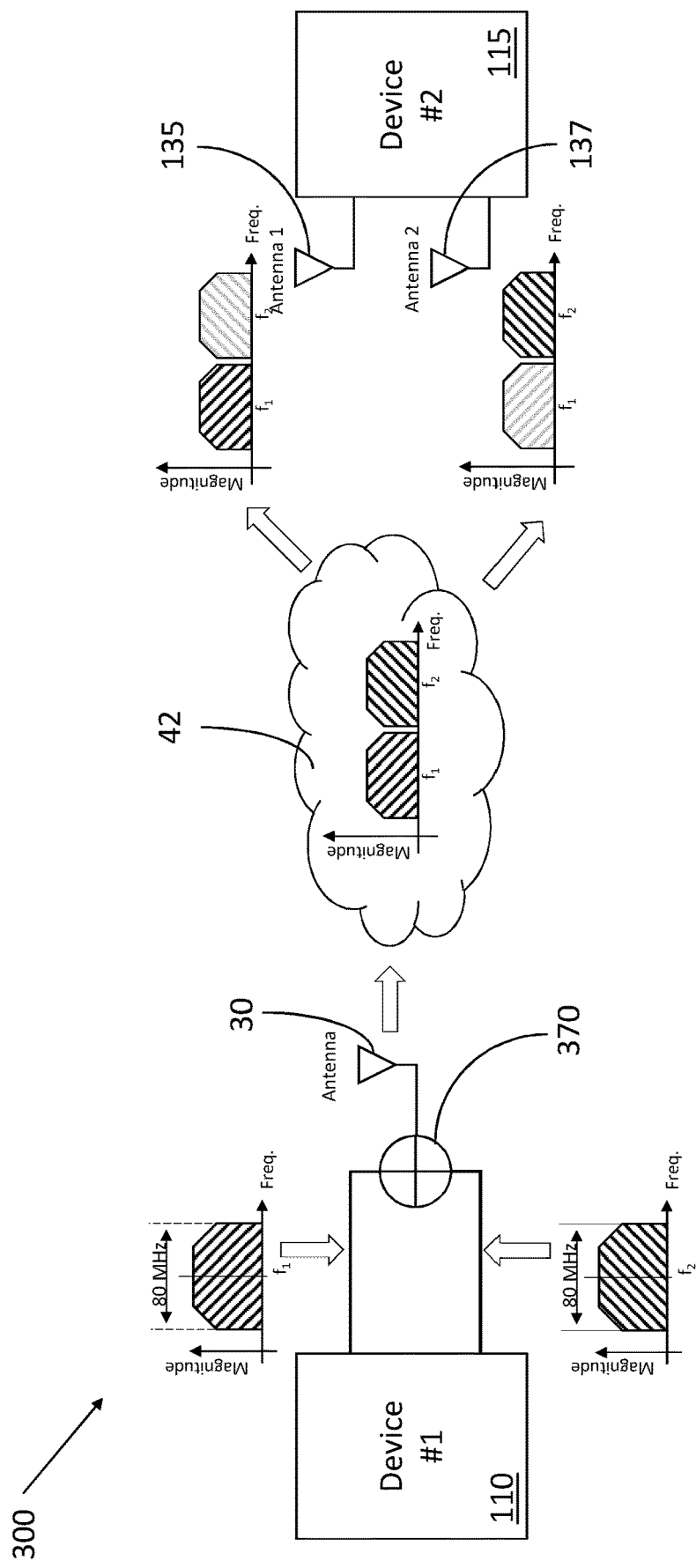
FIG. 3A is a schematic diagram of a Wi-Fi/Radio frequency 80+80 multiple spatial stream communication system.

FIG. 3A is a schematic diagram illustrating a Wi-Fi communication system operable to combine two non-contiguous 80 MHz frequency bands by a single antenna.

A first device 110 is in communication with a summing amplifier 370 through two channels. The summing amplifier 370 is in communication with a first antenna 30. The first antenna 30 is operable to provide RF signals 42 to the first antenna 135 that is in communication with second device 115. The first antenna 30 is also operable to provide RF signals 42 to the second antenna 137 that is in communication with the second device 115. The first antenna 30 is operable to receive RF signals 42 from the first antenna 135 that is in communication with the second device 115. The first antenna 30 is also operable to receive RF signals 42 from the second antenna 137 that is in communication with the second device 115. The first antenna 135 is operable to receive a first of the non-contiguous 80 MHz frequency bands. The second antenna 137 is operable to receive a second of the non-contiguous 80 MHz frequency bands.

The 80+80 bandwidth mode as illustrated schematically in FIG. 3A, is a special case of channel bonding whereby two non-contiguous 80 MHz frequency bands are combined for data transmission by a single antenna. The first 80 MHz band is received by a first analogue (RF) frontend while the second 80 MHz band is received by a second, different analogue (RF) frontend. The first and second frontends receive their respective signals at two different carrier frequencies. Alternatively, each ban is transmitted using a different RF frontend with a different carrier frequency (not shown).

Multiuser-MIMO (MU-MIMO)

Figure 3B:
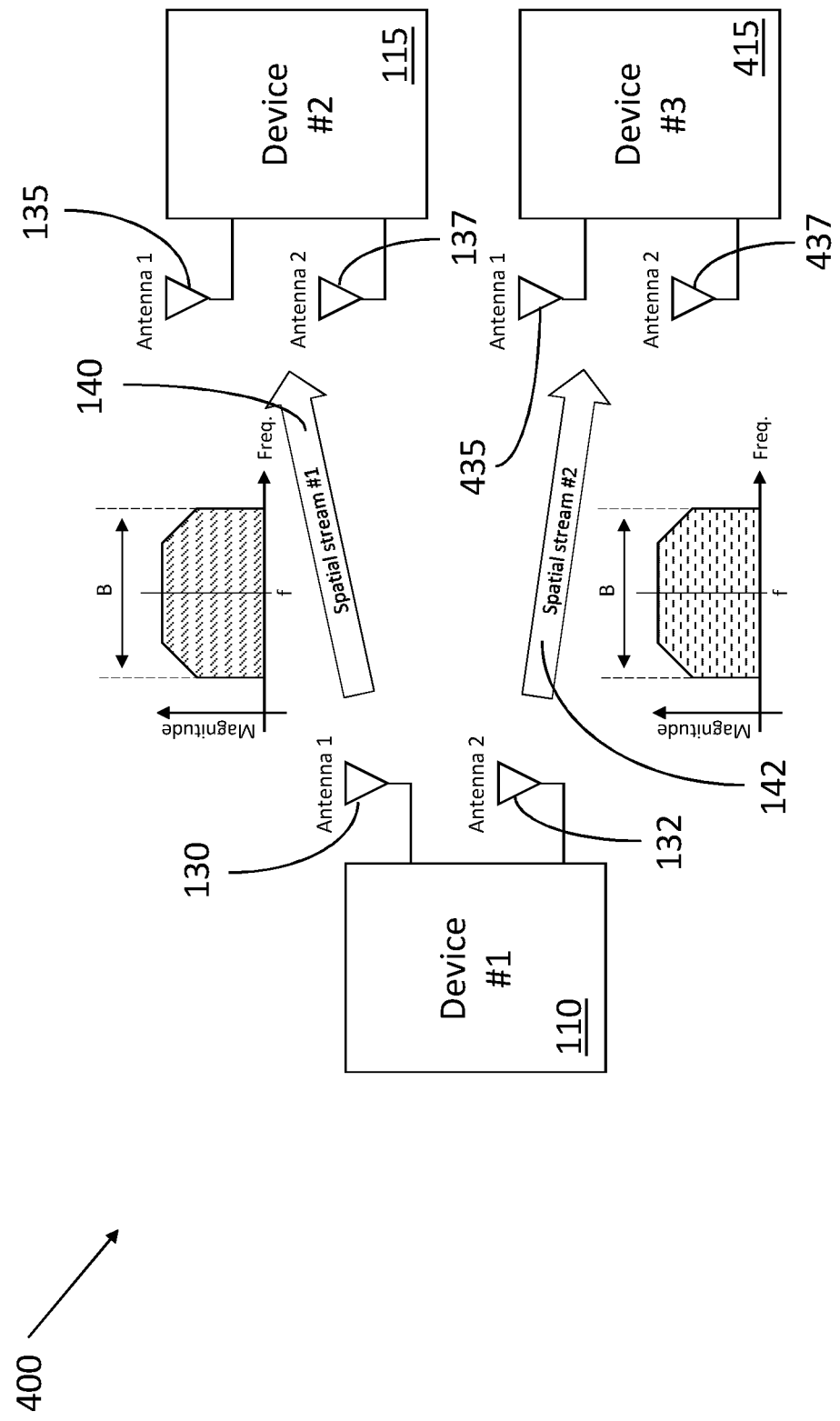
FIG. 3B is a schematic diagram of a Wi-Fi/Radio frequency multiple spatial stream communication system connecting to multiple devices simultaneously.

FIG. 3B is a schematic diagram illustrating a Wi-Fi communication system operable to transmit and receive two different spatial streams to two different devices.

A first device 110 is connected to a first antenna 130. The second device 115 is connected to a first antenna 135 and a second antenna 137. The first antenna 130 is operable to transmit and receive a first spatial stream 140. The first antenna 135 and the second antenna 137 of the second device 115 are also operable to transmit and receive the first spatial stream 140. The first device 110 is able to communicate with the second device 115 by the first spatial stream 140.

The first device 110 is also connected to a second antenna 132. The third device 415 is connected to a first antenna 435 and a second antenna 437. The second antenna 132 of the first device 110 is operable to transmit and receive a second spatial stream 142. The first antenna 435 and the second antenna 437 of the third device 415 are also operable to transmit and receive the second spatial stream 142. The first device 110 is able to communicate with the third device 415 by the second spatial stream 142.

MU-MIMO, as illustrated schematically in FIG. 3B for example, builds on the basic MIMO concept by allowing each MU-MIMO enabled device to communicate with one or more MU-MIMO enabled remote devices simultaneously using one or more unique spatial streams to each remote device.

Figure 4B:
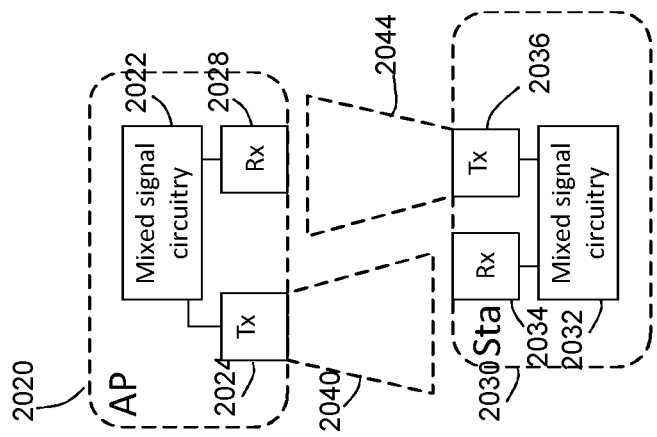
FIG. 4B is a schematic diagram of a wireless communication system according to an embodiment.
Figure 4A:
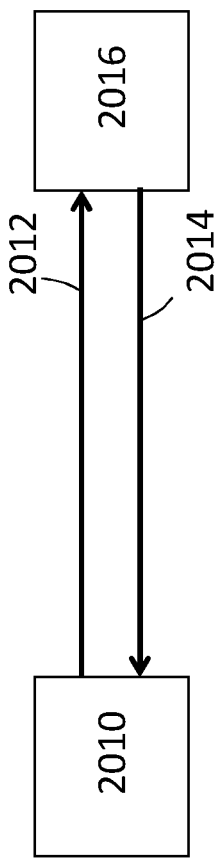
FIG. 4A is a schematic diagram of an optical wireless communication system according to an embodiment.

An OWC system according to certain embodiments is now described in overview in relation to FIGS. 4A and 4B, before use of MIMO techniques and/or devices according to certain embodiments are described in more detail.

In the various figures illustrating embodiment described below, for example FIGS. 5, 6, 8, 9A, 9B, 10A, 10B, 11, 12, 14 various signals are illustrated schematically in the figures, in the form of plots of signal magnitude versus frequency. The plots generally represent bandwidth and/or centre frequencies of signals representing, for example, data streams and illustrate for example in some embodiments the combining and/or separating of signals or portions of signals by different components of, or present at different points in, systems of embodiments in operation. Shading and/or hatching is used to indicate corresponding data or data streams. In several of the figures arrows are used to indicate the points in the system to which the signals correspond or are present in operation.

FIG. 4A is a schematic block diagram illustrating an optical wireless communication (OWC) link. A first OWC apparatus 10 is configured to send a wireless optical signal in which information is encoded. The first OWC apparatus 2010 is configured to send the wireless optical signal through a first optical communication channel 2012 to a second OWC apparatus 2016. The first optical communication channel 2012 may be a free-space communication channel. Free space communication channels include transmission of optical signals through air, space, vacuum, liquid such as water or similar. The first optical communication channel has a first characteristic optical wavelength.

The second OWC apparatus 2016 is configured to send a further wireless optical signal in which information is encoded. The second OWC apparatus 2016 is configured to send the further wireless optical signal through a second optical communication channel 2014 to the first OWC apparatus 2010. The second optical communication channel 2014 may be a free-space communication channel. The second optical communication channel has a second characteristic optical wavelength, which is different from the first characteristic optical wavelength.

The first OWC apparatus 10 may be an access point (AP) which comprises a transmitter and a receiver. An AP may provide access to a local network. An access point may provide data transmission to and/or from a wired network or a Wi-Fi™ or other wireless network and/or other optical wireless communications network, optionally a LiFi network.

The second OWC apparatus 2016 may be a station (STA) which comprises a transmitter and a receiver. A station may be portable or fixed. Without limitation, examples of stations include personal computers, laptops, desktops and smart devices, including mobile devices (for example, mobile phones, tablets or digital book readers). Portable stations may be powered by their own battery resource.

The apparatuses 2010, 2016 may support a bi-directional communication protocol. The apparatuses 2010, 2016 may support any suitable communication protocol, for example IEEE 802.15.7, 802.15.13, 802.11 or extensions or developments thereof; ITU-T G.9960 or extensions or developments thereof; or ITU-T G.vlc or extensions or developments thereof.

Each of the optical communication channels 2012, 2014 may comprise a respective LiFi communication channel. A LiFi communication channel may have various desirable characteristics. For example, it may have a range of up to 20 m or more, It has high bandwidth in comparison with for example RF or IrDA (Infrared Data Association) protocols. Full duplex is possible by using two frequencies or frequency ranges allowing high throughput speeds, e.g. halving time or doubling bandwidth of communication. Reception bandwidth is independent of transmission bandwidth, and therefore there may potentially be twice the bandwidth available for the communication exchange. It may be difficult to fake due to complexity of protocol and data stream format. It is possible to spectrum hop, for example.

In some embodiments, the first OWC apparatus 2010 may comprise or form part of a Access Point (AP) device or a luminaire, which may be part of a lighting system. The second OWC station (STA) apparatus 2016 may form part of a user device. The first optical communication channel 2012 may be a downlink channel that is used to send information from the AP to the STA. The second optical communication channel 2014 may be an uplink channel that is used to send information from the STA to the AP. In other embodiments the OWC apparatuses 2010, 2016 may each comprise or form part of any suitable device, for example any device configured to transmit and/or receive OWC data.

FIG. 5B is a schematic diagram of an OWC link in accordance with an embodiment. The OWC link comprises an access point (AP) 2020 and a station (STA) 2030 which are configured for full-duplex communication with each other.

The AP 2020 comprises mixed signal circuitry 2022, an AP transmitter 2024, and an AP receiver 2028.

The mixed signal circuitry 2022 is configured to receive data from a network (not shown) to which the AP 2020 is connected, and to output a modulation signal that comprises or is representative of the data. In other embodiments, the AP 2020 is not networked. The data may be obtained from any suitable data source or data store.

The mixed signal circuitry 2022 includes, amongst other components, baseband circuitry, a digital to analogue converter, an analogue to digital converter, an amplification chain, at least one analogue filter, at least one power supply and at least one driver (all not shown), which together can provide desired conditioning of signals. In other embodiments, some of the components listed above may be omitted from the mixed signal circuitry 2022 and/or further components not listed such as a processor may be present. The processor may provide a controller for controlling operation of any one or more of the components of the apparatus and/or signal conditioning or other processes that may be performed.

The AP transmitter 2024 comprises a light source (not shown), which is configured to emit modulated light having a first characteristic wavelength. The AP transmitter 2024 further comprises circuitry (not shown) which is configured to drive the first light source to emit light having an intensity that is modulated in accordance with the modulation signal. The light source may comprise any suitable light source, for example an LED, a laser, for example a VCSEL (vertical-cavity surface-emitting laser) or a laser diode, or an LEP (light-emitting plasma). The light source may comprise a plurality of light sources, for example an array of light sources.

The AP receiver 2028 comprises at least one photodetector (not shown) which is configured to detect modulated light having a second characteristic wavelength. Any suitable photodetector or photodetectors may be used. For example, the AP receiver 2028 may comprise at least one Si PIN photodiode, silicon photomultiplier (SiPM), single photon avalanche diode (SPAD), Graphene-CMOS high-resolution sensor or avalanche photodiode (APD).

The AP receiver 2028 further comprises receiver circuitry that is configured to obtain a signal from the photodetector that is representative of the light received by the photodetector, and to process the signal from the photodetector to provide a receiver signal to the mixed signal circuitry 2022.

The mixed signal circuitry 2022 is further configured to receive the receiver signal from the AP receiver 2028 and demodulate the receiver signal to obtain data. The mixed signal circuitry 2022 is further configured to send the data to the network (not shown) to which the AP 2020 is connected.

The STA 2030 comprises mixed signal circuitry 2032, a STA receiver 2034, and a STA transmitter 2036.

The mixed signal circuitry 2032 comprises baseband circuitry, a digital to analogue converter, an analogue to digital converter, an amplification chain, at least one analogue filter, at least one power supply and at least one driver (all not shown) which together can provide desired conditioning of signals. In other embodiments, some of the components listed above may be omitted from the mixed signal circuitry 2032 and/or further components not listed may be present such as for example a processor. The mixed signal circuitry 2032 may be configured to provide full-duplex communication and/or half-duplex communication.

The STA receiver 2034 comprises a photodetector (not shown) that is sensitive to light Photodetectors that are sensitive to a broad spectrum of light are known. For example, a photodetector may be sensitive to ultraviolet, visible and infrared wavelengths. In one embodiment, the STA receiver 2034 comprises at least one APD (avalanche photodiode). In other embodiments, the STA receiver 2034 comprises at least one Si PIN photodiode. In further embodiments, the STA receiver 2034 may comprise any photodetector that is capable of receiving light of suitable frequencies. For example, the STA receiver 2034 may comprise at least one Graphene-CMOS high-resolution sensor. In further embodiments, the STA receiver 2034 may comprise at least one silicon photomultiplier (SiPM) or single photon avalanche diode (SPAD) as the photodetector.

The STA receiver 2034 further comprises circuitry (not shown) which is configured to receive a signal from the photodetector that is representative of modulated light received by the photodetector and to output a receiver signal to the mixed signal circuitry 2032.

The mixed signal circuitry 2032 is further configured to receive the receiver signal from the STA receiver 2034 and demodulate the receiver signal to obtain data. The mixed signal circuitry 2032 includes, amongst other components, an analogue to digital converter (not shown). The data received by the STA 2030 may be used in any suitable manner, for example to provide information or a service to a user of a device in which the STA 2030 is incorporated.

The mixed signal circuitry 2032 is further configured to obtain digital or analogue data for uplink transmission. For example, the mixed signal circuitry 2032 may obtain data from an input by a user of a device in which the STA 2030 is incorporated, or from processes running in the device in which the STA 2030 is incorporated. The mixed signal circuitry 2032 is configured to output a modulation signal that comprises or is representative of the data. The mixed signal circuitry 2032 includes, amongst other components, a digital to analogue converter (not shown).

The STA transmitter 2036 is used to transmit modulated light. The STA transmitter 2036 comprises a light source which is configured to emit modulated light having the second characteristic wavelength. In other embodiments, any suitable wavelength or range of wavelengths may be emitted by the STA transmitter 2036. The STA transmitter 2036 further comprises circuitry (not shown) which is configured to receive a modulation signal and to drive the light source of the first STA transmitter 2036 to emit light having an intensity that is modulated in accordance with the modulation signal.

The light source of the STA transmitter 2036 may comprise any suitable light source, for example a laser, for example a VCSEL (vertical-cavity surface-emitting laser) or a laser diode, or an LEP (light-emitting plasma). The light source of the STA transmitter 2036 may comprise a plurality of light sources, for example an array of light sources.

Any suitable modulation scheme or schemes may be used for modulation of light by the AP transmitter 2024 and STA transmitter 2036. For example, orthogonal frequency division multiplexing (OFDM) modulation schemes are used in some embodiments, and the demodulation is from the OFDM modulation scheme. In further embodiments and without limitation, other modulation schemes may be used, for example on-off keying (OOK), phase shift keying (PSK), M-ary pulse amplitude modulation (M-PAM), M-ary quadrature amplitude modulation (M-QAM), Discrete Hartley transformation, Wavelet packet division multiplexing (WPDM), Hadamard coded modulation (HCM), pulse-position modulation (PPM), Colour shift keying (CSK), carrier-less amplitude and phase (CAP), or discrete multi-tone (DMT). The light may be modulated at a modulation rate between 1 kHz and 1 PHz, for example at a modulation rate between 1 MHz and 100 GHz.

The modulation scheme or schemes may form part of an OWC communication protocol, such that the optical signal is produced according to the OWC communication protocol. The OWC communication protocol may be packet-based.

Further embodiments are now described in relation to FIGS. 5 to 17, concerning the use of MIMO techniques and/or MIMO devices in OWC systems according to embodiments.

The features described in relation to FIGS. 5 to 17 may, in some embodiments, be implemented in systems according to the embodiments of FIG. 4A or 4B. Only certain parts of the whole OWC system or apparatus are illustrated in FIGS. 5 to 17, for clarity. Each of the various components described in relation to FIGS. 5 to 17 may, in some embodiments, be implemented in the systems of the embodiments of FIG. 4A or 4B in any suitable manner, for example, as part of one or more of mixed signal circuitry 2022 and/or 2032, transmitter 2024 and/or 2044, receiver 2028 and/or 2034, and/or as separate components connected to the mixed signal circuitry, transmitter and/or receiver.

For instance, amongst other things, the embodiments of FIGS. 5 to 17 are described below as including variously mixers, oscillators, baseband devices, amplifiers, antennas, frontends, combiners, filters, phase-locked loops and clocks. According to some embodiments, such components may be implemented as part of, or connected to, the mixed signal circuitry of the systems of FIG. 4A or 4B, or where appropriate as part of or connected to the transmitters and/or receivers of those systems. Furthermore, such components, whether on a transmit side or a receive side, may be considered to comprise or form part of conditioning circuitry.

The conditioning circuitry according to embodiments may receive signals from, or provide signals to, devices, for example devices 10, 110, 115, 1702, 1720. According to embodiments, or variants of the embodiments, such devices can be MIMO devices, for example MIMO baseband devices. The MIMO devices can comprise MIMO devices intended for use with radio-frequency (RF) transmission circuitry. The MIMO devices can comprise devices operating in accordance with the 802.11 standard. The MIMO devices can comprise a MIMO baseband device and an RF integrated circuit.

Adapting Wi-Fi Signals for OWC

Two methods for generating a baseband signal suitable for OWC from existing Wi-Fi or similar wireless communication systems according to certain embodiments are as follows.

Modulate to Intermediate Frequency (IF)

FIG. 5 is a schematic diagram illustrating a system to receive an in-phase signal and a quadrature signal from a baseband device and output an intermediate frequency signal.

The in-phase signal is received by a first mixer 560. The quadrature signal is received by a second mixer 562. The first mixer 560 receives an input from a local oscillator 550 with a 0 degree phase offset. The second mixer 562 receives an input from the local oscillator 550 with a 90 degree phase offset. The first mixer 560 and the second mixer 562 output signals that are received by a summing amplifier 570. The summing amplifier 570 outputs a low intermediate frequency/baseband signal. The mixers 560, 562 and amplifier make up or form part of conditioning circuitry.

If the in-phase and quadrature (I/Q) signals from the baseband device are directly accessible, it is possible to utilise a low frequency local oscillator (e.g. $B/2+\Delta$ where B is the signal bandwidth and $\Delta$ is a small guard band) to directly modulate the baseband signal to low IF. This must be done to shift the double-sided signal spectrum to positive-only frequencies that can be transmitted/received by the OWC frontend.

Down-Convert from RF

Figure 6:
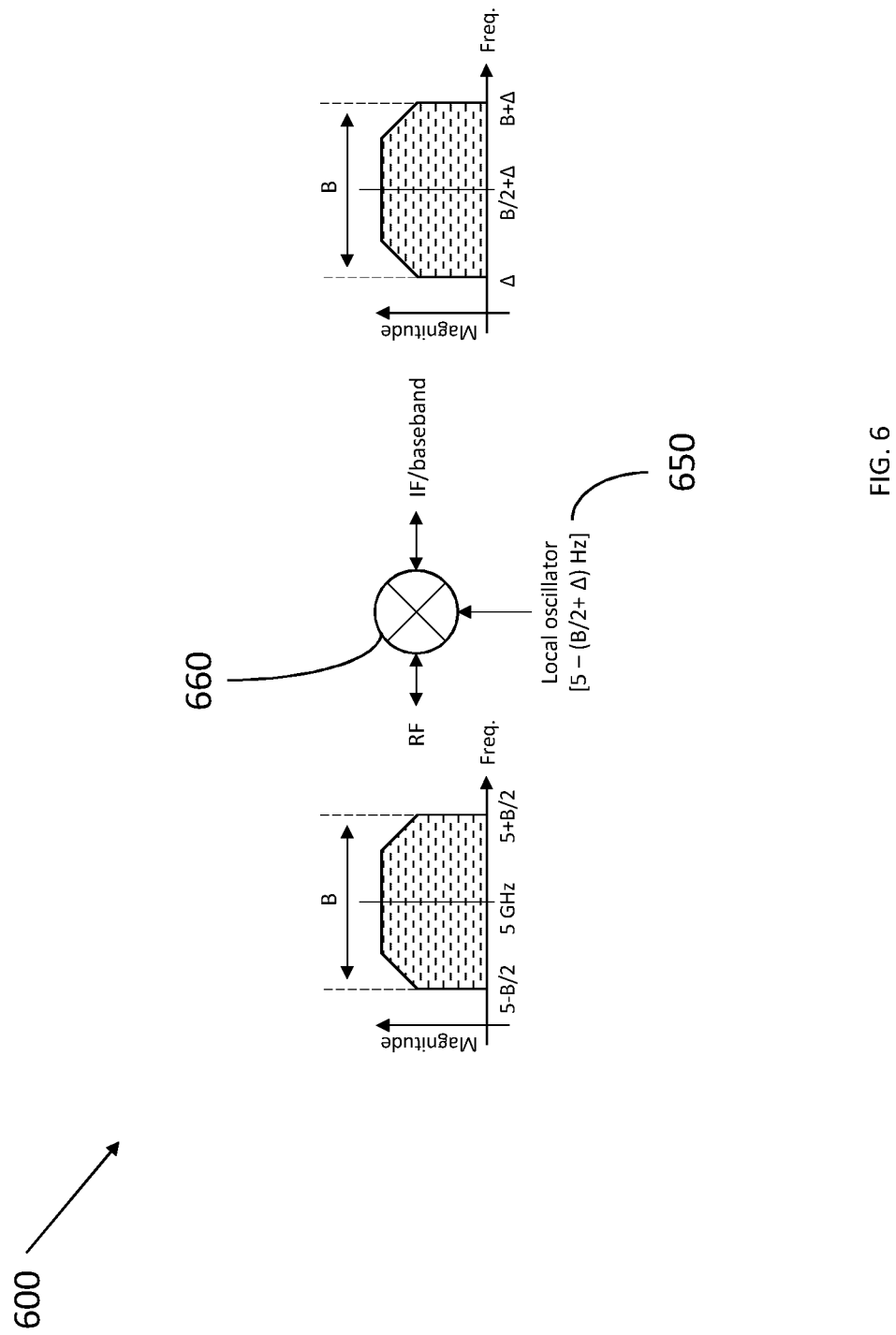
FIG. 6 is a schematic diagram of system according to an embodiment.

FIG. 6 is a schematic diagram illustrating a system that receives the RF output from the RFIC, down-converts this signal, and output the down-converted signal.

The RF signal is received by a mixer 660, forming part of conditioning circuitry. The mixer 660 also receives input from a local oscillator 650. The mixer 660 outputs the intermediate frequency/baseband signal.

If direct access to the baseband I/Q is unavailable, it is still possible to down-convert the RF output from the RFIC using a suitable mixer and local oscillator. This relies on the property that when a signal with a centre frequency f is mixed with a local oscillator frequency $\lambda$, the output consists of two distinct components: one at $f-\lambda$ and the other at $f+\lambda$. Therefore, with an appropriate choice of $\lambda$, a baseband signal suitable for the OWC frontend can once again be realised as shown in the illustration below. At the receiver, the process is reversed and the OWC baseband signal up-converted back to RF can be fed back into the RFIC, for example as per a standard Wi-Fi operation mode.

Certain Features of MIMO Transmission Systems

Figure 7:
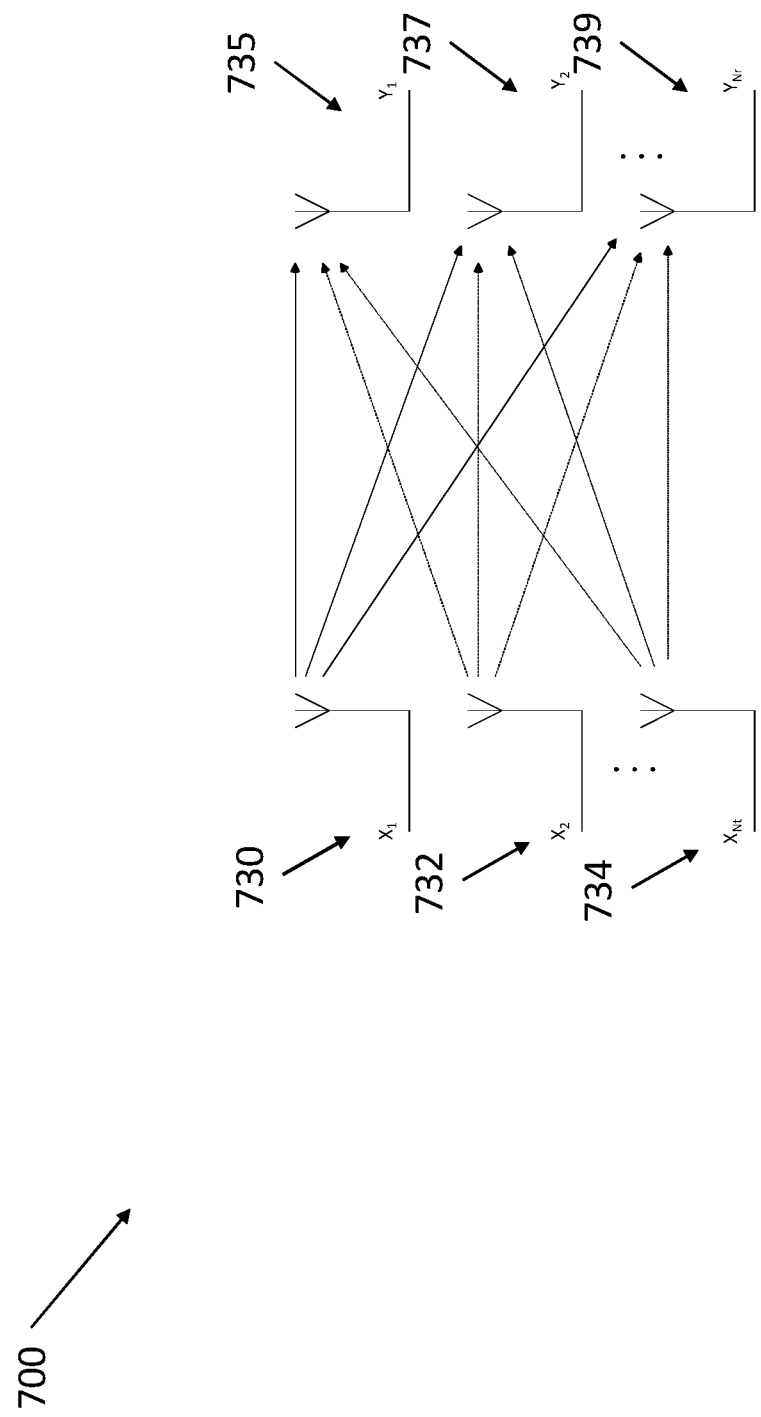
FIG. 7 is a schematic diagram of a multiple input multiple output channel according to an embodiment.

FIG. 7 is a schematic diagram illustrating a MIMO transmission system that comprises multiple antennas on the transmitter and receiver sides. The first antenna 730 is operable to communicate with the fourth antenna 735, fifth antenna 737, and sixth antenna 739. The second antenna 732 is operable to communicate with the fourth antenna 735, fifth antenna 737, and sixth antenna 739. The third antenna 736 is operable to communicate with the fourth antenna 735, fifth antenna 737, and sixth antenna 739.

The concept of MIMO transmission systems in relation to wireless communication generally relates to multiple antennas on transmitter and receiver sides. MIMO can be subdivided into three main categories: precoding, spatial multiplexing and diversity coding (defined at the start of this document). While aspects of all categories are discussed below, various embodiments generally relate to the use of spatial multiplexing. If using the signal modulation technique of orthogonal frequency-division multiplexing (OFDM), one can define a channel matrix used for calculating the received signal strength at each receiving antenna. The channel is assumed to be flat.

In a such a system for $N_t$ transmitters and $N_r$ receivers, the received signal can be represented as a vector y.

$$y = Hs + n$$

where n is the noise. In the case of OWC, this is the sum of ambient shot light noise and thermal noise and is independent of the transmitted signals and main noise impairment assumed in OWC. The transmitted signal vector is denoted by $s = [s_1 \ldots s_{N_t}]^T$, with $[\cdot]^T$ being the transpose operator. The signal emitted by transmitter $N_t$ is given by $s_{N_t}$ etc. H is the $N_t \times N_r$ channel matrix below where $h_{n_r n_t}$ represents the transfer factor of the wireless link between transmitter $n_t$ and receiver $n_r$.

$$H = \begin{pmatrix} h_{11} & \cdots & h_{1N_t} \\ \vdots & \ddots & \vdots \\ h_{N_r 1} & \cdots & h_{N_r N_t} \end{pmatrix}$$

If H is invertible, then the channel can be retrieved.

Due to the frequent lack of spatial diversity with respect to multiple channels transmitted in the light spectrum, the matrix H is singular if using typical OWC TXs and RXs in a MIMO configuration to transmit the same information. In other words, a receiver cannot tell which transmitter a signal comes from because they all look the same or very similar. Therefore, it is typically very difficult to realise MIMO gains from a wireless communication system where the RF antennas have been replaced with single wavelength (colour) optical transceivers in a straight-forward, one-for-one basis. There is a significant technical and commercial incentive to finding a solution to this as it would allow the development of high performance OWC systems that can reuse existing commercially available baseband solutions that do not require the (very expensive) development of a bespoke OWC baseband chip.

One solution is to replace the RF antennas with the same number of optical transceivers where each transceiver operates at a different wavelength (e.g. colour). This is known as wavelength division multiplexing (WDM). Since each wavelength is independent, the transmissions remain orthogonal to each other (even though they may share the same space and spectrum at the same time). The channel matrix H remains invertible (due to the orthogonality of the wavelengths), allowing the MIMO algorithms to function correctly and therefore the multiplexing gain is realised. The main drawback of this approach is the number of different wavelengths and transceivers (e.g. comprising or associated with frontends and/or frontend circuitry) required which can be challenging from both a cost and optical wavelength separation (emitter bandwidth and filter response) perspective. Another solution is the use of different optical polarisation but the same drawbacks as WDM apply.

The present document describes a number of arrangements that allow the MIMO multiplexing gains to be realised (invertible H matrix) while reducing the complexity and cost of a high performance OWC system, which may be implemented using existing, commercially available MIMO capable baseband devices.

The following configurations can perform OWC using, for example, existing MIMO capable wireless communication baseband devices. For example, the baseband devices may be 802.11 baseband devices designed for use in RF communication such as Wi-Fi. This is achieved, for example, using MIMO enabled 802.11 Wi-Fi chips/chipsets, specifically repurposing the Wi-Fi chips for use in OWC.

MIMO Spatial Stream Combining

There are different options of combining MIMO outputs for creating an OWC baseband signal.

Spatial Stream Combining

Figure 8:
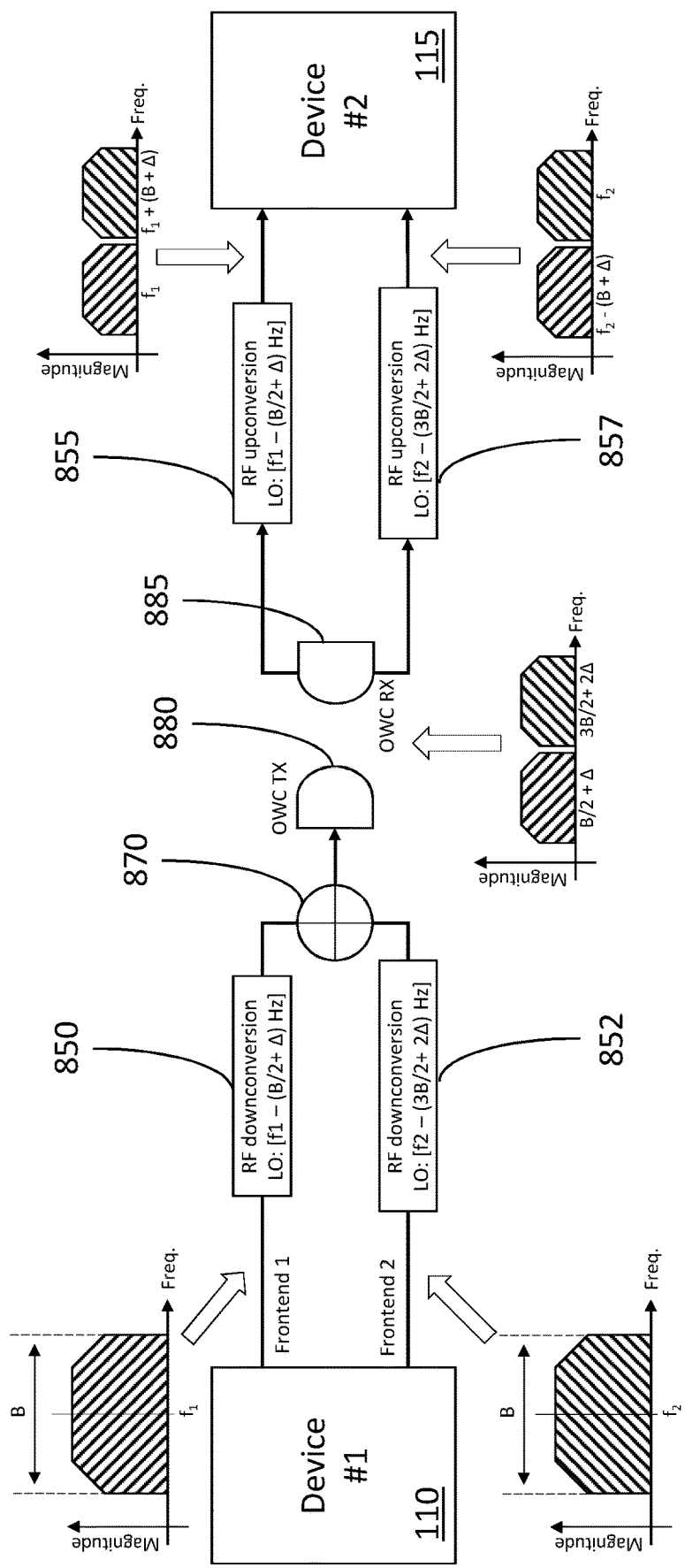
FIG. 8 is a schematic diagram of an optical wireless communication according to another embodiment.

FIG. 8 is a schematic diagram illustrating an OWC communication system operable for spatial stream combining. For MIMO spatial streams, f1=f2, where f1 and f2 are the frequencies or frequency ranges used for each of the spatial streams respectively. The same circuit can be applied to channel aggregation systems as well to optimize the inter-channel spacing (e.g. when the two channels are far apart: f2−f1>>B).

The first device 110 is in communication with conditioning circuitry that includes a first RF downconversion local oscillator (LO) 850 and provides a first frontend stream with frequency range centred at frequency f1 to LO 850. The first device 110 is in communication with a second RF downconversion LO 852 included in the conditioning circuitry and that provides a second frontend stream with frequency range centred at frequency f2 to LO 852. Outputs from the first RF downconversion LO 850 and the second RF downconversion LO 852 are provided as inputs to a combiner in the form of summing amplifier 870 that is included in the conditioning circuitry. The output of the summing amplifier 870 is an input for an OWC transmitter 880. The OWC transmitter 880 is operable to transmit one or more streams to an OWC receiver 885 using modulated light transmission in accordance with OWC techniques. The OWC receiver 885 is in communication with a first RF upconversion LO 855 and a second RF upconversion LO 857. The second device 115 is in communication with the first RF upconversion LO 855 and a second RF upconversion LO 857.

As illustrated schematically in FIG. 8, the multiple spatial streams generated by a MIMO enabled baseband device can be down-converted and combined to yield a single baseband signal that can be subsequently transmitted by at least one transmitter in a first single wide band OWC transceiver and received by a single receiver or receiver array in a second wide band OWC transceiver. The combining, at the transmit side, and subsequent separating, at the receive side, of the data streams is illustrated schematically in FIG. 8 by the magnitude versus signal plots included in the figure. It can be seen that there is a separation by a guard band between the two parts of the combined signal. The OWC transceiver may support a signal bandwidth that is at least as large as the total bandwidth being combined across all the spatial streams. For the process illustrated in FIG. 8, $f_1 = f_2$ for 2 spatial streams.

Even though only 2 channels/spatial streams are illustrated in FIG. 8, the concept is scalable and can be extended to support any number of channels (e.g., N) as long as the OWC transceiver can support a signal bandwidth of at least $N \times (B + \Delta)$, where B is the bandwidth of each stream and $\Delta$ is a small guard band between each of the signal bands. $\Delta$ should be an integer multiple of the subcarrier spacing to maintain optimal orthogonality between each signal band/segment.

The combiner in FIG. 8 and subsequent figures may be any system or circuitry that allows two or more electrical signals to be added together—e.g., a summing amplifier or a resistive combiner.

Summing amplifiers in embodiments may be replaced with resistive combiners or any other suitable combiner in alternative embodiments.

It is clear that down-converting each of the streams to a non-overlapping signal band and then combining in the electrical domain can maintain near perfect isolation (within limits of the electronics) between the spatial streams from the perspective of the baseband device. The H matrix is therefore invertible and allows the OWC system to deliver nearly maximum spatial multiplexing gain from the perspective of the digital baseband (×N)—an achievement that is almost impossible to realise in typical RF environments.

Spatial stream combining for OWC therefore offers two key advantages:
1. The ability to fully exploit the capability of the baseband device (spatial multiplexing gain) which otherwise generally goes unrealised in typical RF wireless environments;
2. The ability to deliver the combined throughput of multiple spatial streams over a single OWC frontend which would otherwise require the use of multiple RF frontends. This is beneficial in smaller portable devices which are typically space constrained and cannot accommodate the larger number of RF antenna for multiple spatial stream transmission to meet the higher data rates that may be achieved with this OWC system.

The RF up conversion may be a direct conversion to RF or include a conversion to an intermediate frequency (IF). The undesired image frequencies may be optionally filtered out at IF or RF.

It should be appreciated that even though the illustration above shows the use of RF up/down-conversion to derive the OWC baseband signal, the same technique is equally applicable to systems where direct modulation to IF is possible (for example as illustrated in FIG. 5)—e.g. a system that is capable of quadrature modulating the I/Q output directly to the OWC baseband signal. The I/Q output of the first antenna may be quadrature modulated to the first sub-band (e.g., B/2+Δ), the I/Q output of the second antenna may be quadrature modulated to the second sub-band (e.g., 3B/2+2Δ), etc.

When I/Q signals are available from the digital baseband, spatial stream combining may be implemented for I and Q signals independently and transmitted/received using independent OWC frontends as shown schematically in FIG. 9.

Figure 9A:
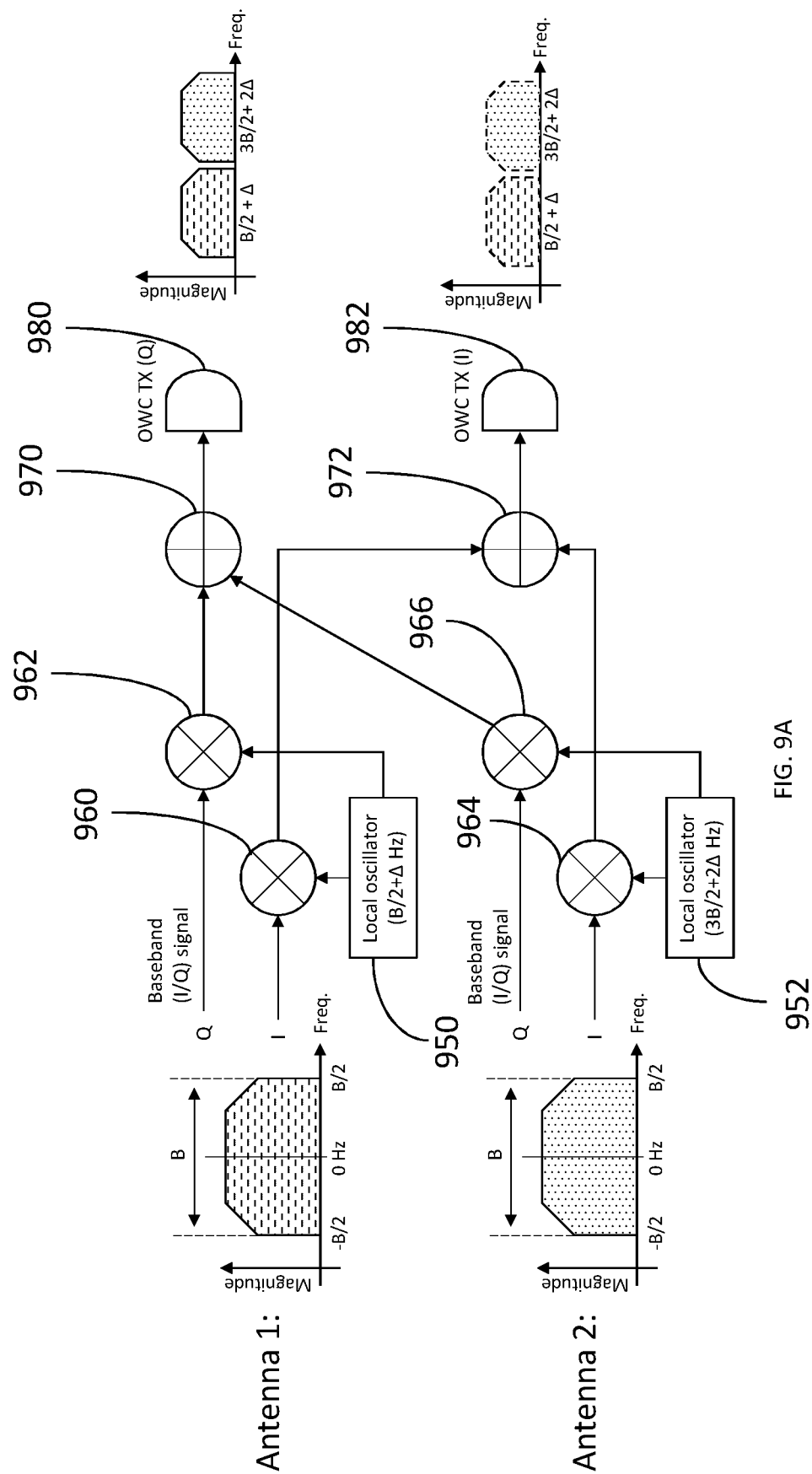
FIG. 9A is a schematic diagram of an optical wireless communication according to another embodiment.

FIG. 9A is a schematic diagram illustrating a system that obtains an in-phase signals and quadrature signals from a baseband-enabled device and processes them for transmission by a first antenna 980 and second antenna 982.

As illustrated schematically in FIG. 9, an in-phase signal is received by a first mixer 960 as an input. A quadrature signal is received by a second mixer 962 as an input. The first mixer 960 and the second mixer 962 also receive input from a first local oscillator 950.

An in-phase signal is received by a third mixer 964 as an input. A quadrature signal is received by a fourth mixer 966 as an input. The first mixer 960 and the second mixer 962 also receive input from a second local oscillator 952.

A first summing amplifier 970 receives input from the second mixer 962 and the fourth mixer 966. The first OWC transmitter 980 receives input from the first summing amplifier 970. The first OWC transmitter 980 is operable to transmit the OWC quadrature signals.

A second summing amplifier 972 receives input from the first mixer 960 and the third mixer 964. The second OWC transmitter 972 receives input from the second summing amplifier 972. The second OWC transmitter 982 is operable to transmit the OWC in-phase signals. The components illustrated in FIG. 9A, apart from the transmitters, make up or form part of conditioning circuitry.

Figure 9B:
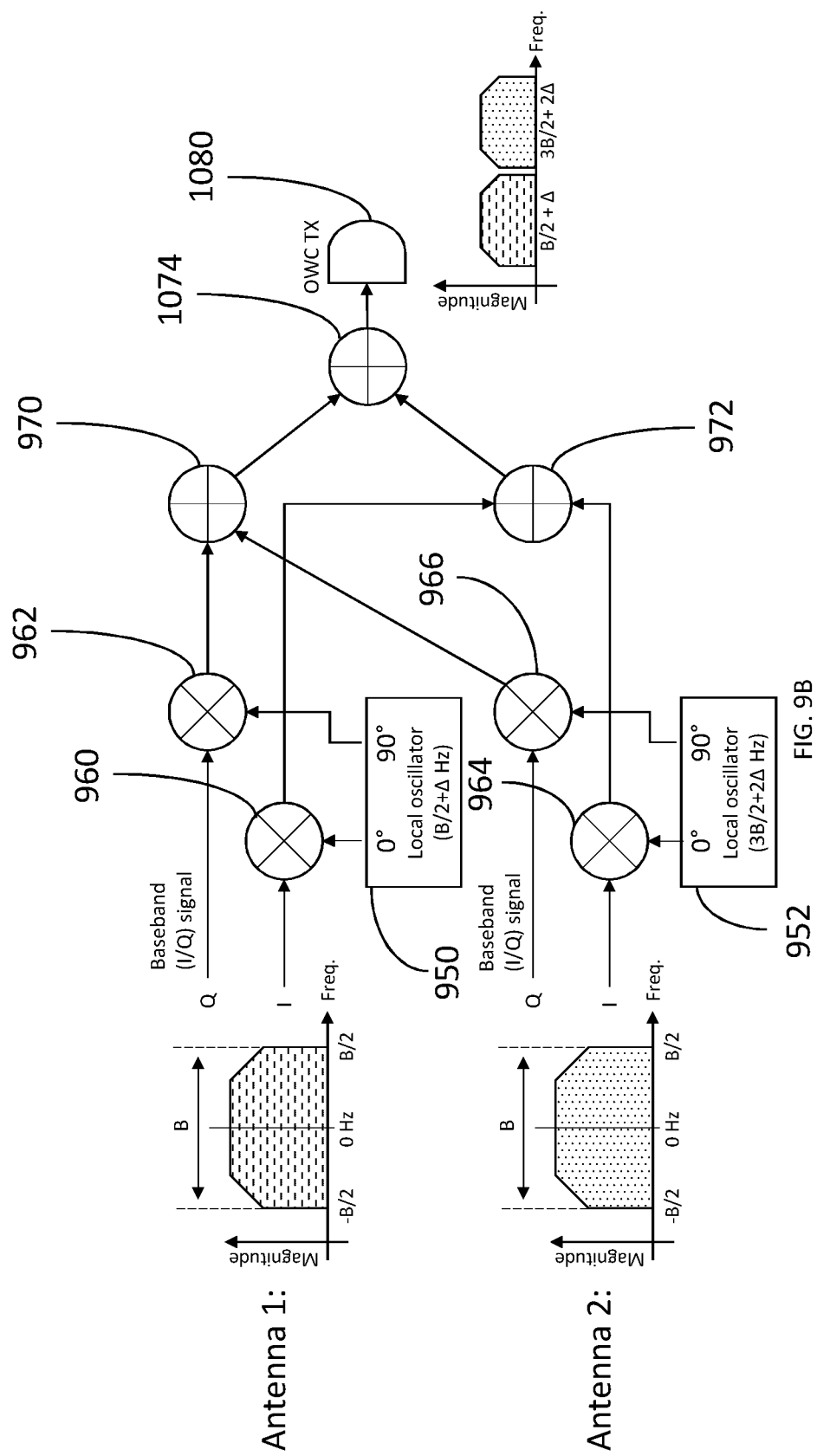
FIG. 9B is a schematic diagram of an alternate optical wireless communication system according to a further embodiment.

An alternative to the embodiment of FIG. 9A is to combine the I and Q signals independently and then add them in quadrature as shown in FIG. 9B. This approach is technically similar to the approach of quadrature modulating each stream to low IF/baseband and then combining prior to transmission over an OWC frontend (as shown in FIG. 5).

The embodiment of FIG. 9B is similar to the embodiment of FIG. 9A but a further summing amplifier is provided, which receives and sums inputs from the summing amplifiers 970, 972 combines those inputs and provides an output to single OWC transmitter 1080 rather than the pair of OWC transmitters 980, 982 of the embodiment of FIG. 9A.

Again, it should be noted that the techniques are not limited to 2 antennas/spatial streams and can be trivially scaled to add multiple additional of MIMO streams Carrier Recovery Looking at FIG. 8, it can be seen that different frequency shifts may be applied to the two MIMO streams. Stream 1 may be down-converted from $f_1$ to ½ B+Δ while stream 2 may be down-converted to 3/2 B+2Δ. In this case, the difference in frequency shift would be B+Δ. Assuming perfect local oscillators at the receiver, the digital baseband would receive stream 1 with a carrier offset of $f_{off}$ while it would receive stream 2 with a carrier offset of $f_{off}+(B+Δ)$ $\varepsilon_{osc}$, where $\varepsilon_{osc}$ is the frequency error of the local oscillator at the transmitter. As an example, B=80 MHz, Δ=20 MHz, $\varepsilon_{osc}$=10 ppm may lead to a difference of up to 1 kHz in carrier frequency offset between the two streams. This can be problematic for typical digital basebands which expect very little frequency offset between spatial streams and can only handle at most a few Hz of difference. This is because large frequency offsets between spatial streams are very unlikely in typical RF propagation environments.

One solution may be to use a high precision oscillator, for example with a frequency error below 0.1 ppm. However, such oscillators are expensive.

A second solution, according to embodiments, is to implement a receiver that estimates the frequency offset of each MIMO stream and applies the required correction to each local oscillator of the RF up-conversion circuits. However, such a receiver is still be relatively complex as it needs to have multiple inputs (for each multiplexed stream) and the necessary frequency offset estimation circuitry.

A third solution may be to recover the transmitter clock at the receiver. The reference clock is used to generate the local oscillator (LO) signal by means of a synthesiser. The synthesiser may have a fixed ratio, or it may be programmable (e.g., a fractional/integer-n synthesiser/PLL). To facilitate this recovery of the transmitter reference clock at the receiver, a pilot signal may be added to the transmitted signal. The pilot may be an attenuated or amplified version of the reference clock, or it may be another signal having a fixed relationship (e.g., a fixed ratio) with the reference clock.

Figure 10A:
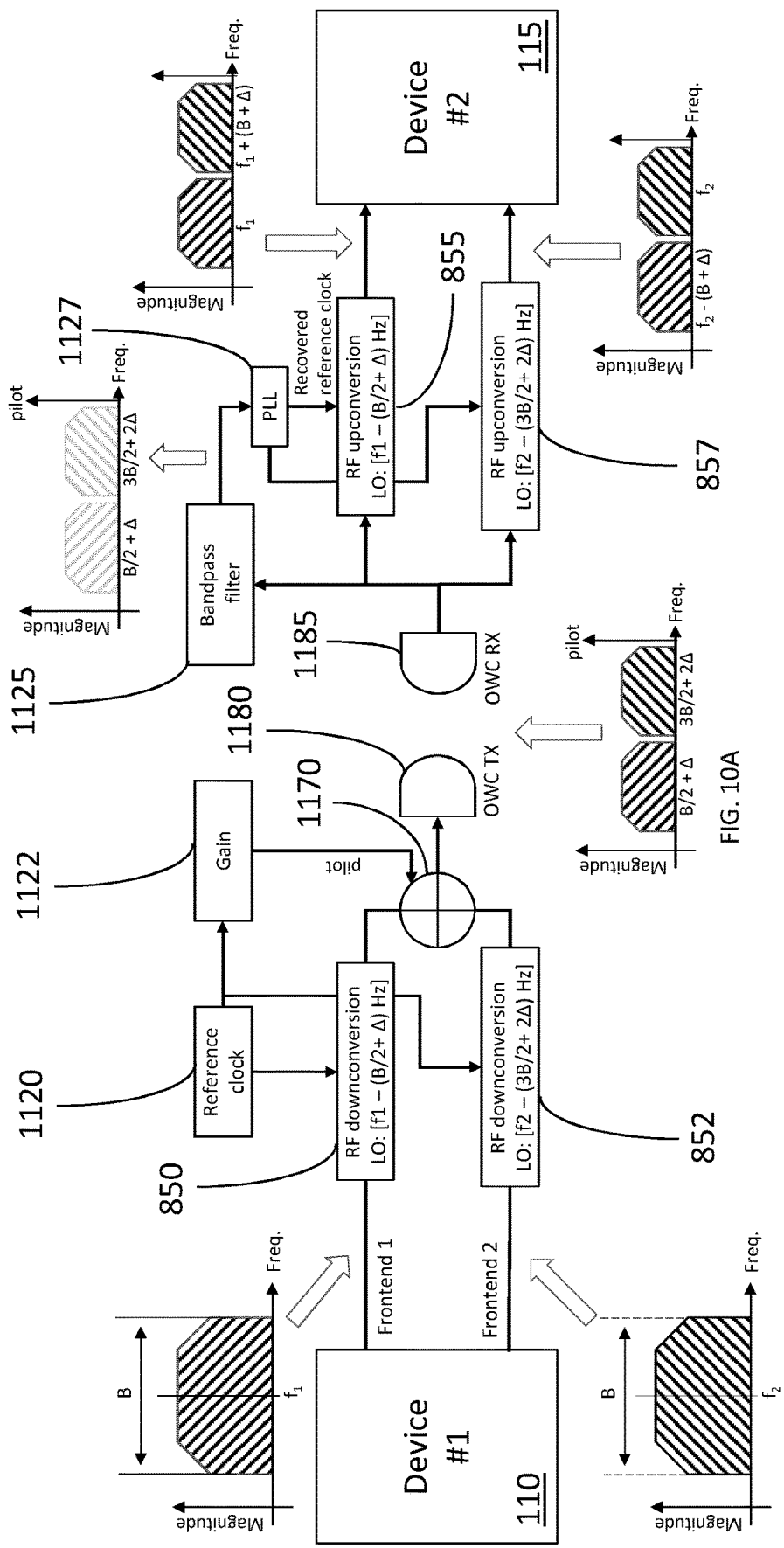
FIG. 10A is a schematic diagram of an optical wireless communication system according to another embodiment.

A solution for recovering the clock at the receiver according to certain embodiments is shown in FIG. 10A On the transmitter side, the pilot signal may be added by attenuating a reference clock signal with an attenuator. On the receiver side, a bandpass filter may be used to extract the received pilot from the received signal and a phase-locked loop (PLL) may lock to the pilot, recovering the reference clock signal. The recovered reference clock signal is then used to derive the local oscillator frequencies for the upconverting mixers—eliminating any frequency offset between the streams.

The system of FIG. 10A provides spatial stream combining with a pilot signal extracted on the receiver side using a bandpass filter and PLL with a VCO lock when no pilot signal is present.

In the system of FIG. 10A, the first device 110 is in communication with a first RF downconversion local oscillator (LO) 850. The first device 110 is also in communication with a second RF downconversion LO 852. The first RF downconversion LO 850 and the second RF downconversion LO 852 are inputs for a summing amplifier 1170.

A reference clock 1120 is operable to provide a reference signal as an input to the first RF downconversion LO 850 and the second RF downconversion LO 852. A gain component 1122 is operable to receive the reference signal from the reference clock 1120 and output a pilot signal. The summing amplifier 1170 receives an input from the gain component 1122.

The output of the summing amplifier 1170 is an input for an OWC transmitter 1180. The OWC transmitter 1180 is operable to transmit one or more streams to an OWC receiver 1185.

The OWC receiver 1185 is in communication with a bandpass filter 1125, a first RF upconversion LO 855, and a second RF upconversion LO 857. The bandpass filter 1125, first RF upconversion LO 855 and the second RF upconversion LO 857 receive input from the OWC receiver 1185.

The bandpass filter 1125 outputs a signal to a phase-locked loop (PLL). The output of the PLL is an input for the first RF upconversion LO 855.

The second device 115 is in communication with the first RF upconversion LO 855 and a second RF upconversion LO 857. The components illustrated in FIG. 10A, other than transmitters and receiver, and devices 110, 115 may be considered to make up or form part of conditioning circuitry.

The embodiments of FIG. 10A can provide spatial stream combining with a pilot extracted on the receiver side using a bandpass filter and PLL.

Figure 10B:
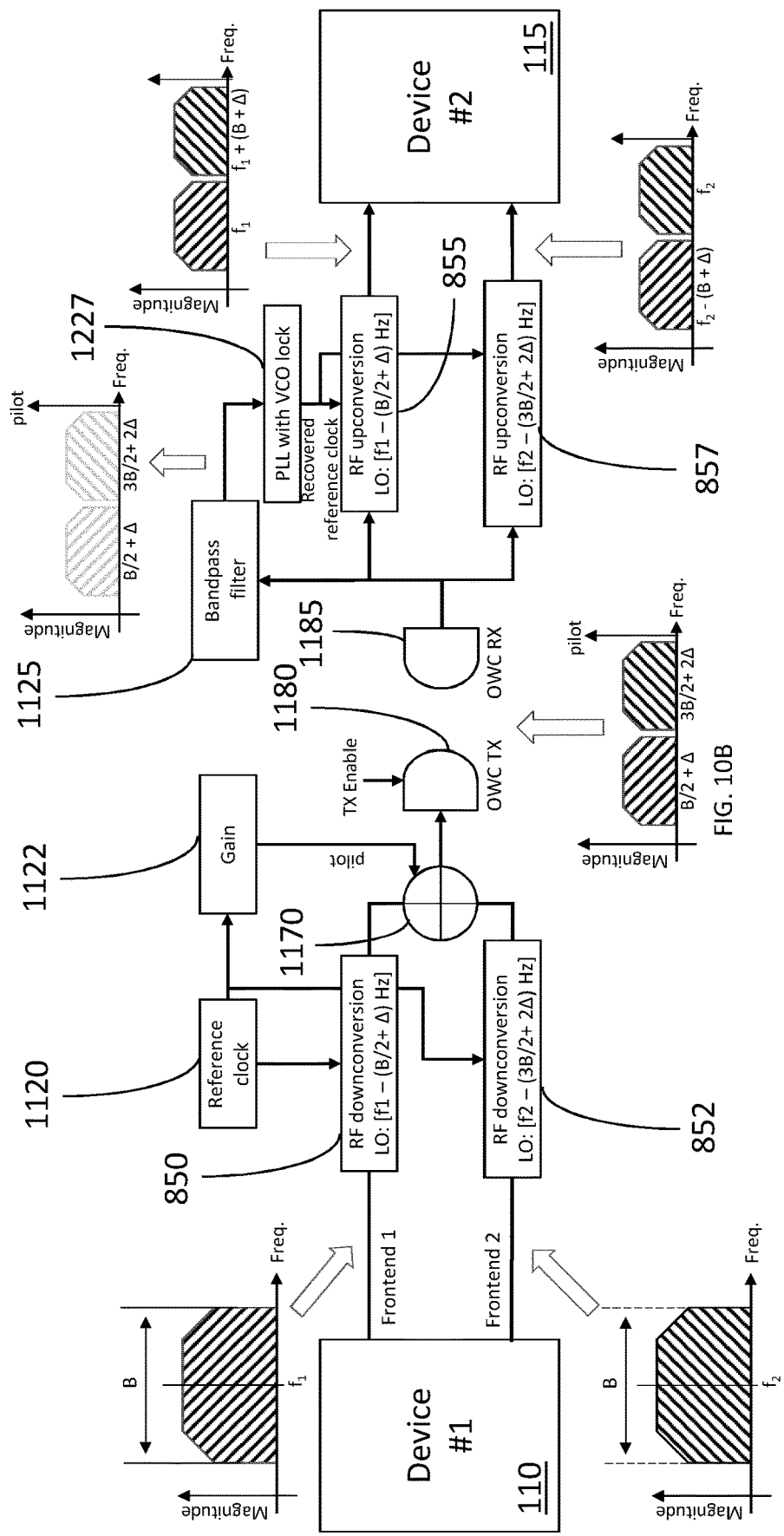
FIG. 10B is a schematic diagram of an optical wireless communication system according to a further embodiment.

For power saving and thermal management reasons it may be desirable to turn on the optical transmitter (optionally an LED, laser or light emitting plasma) only when a packet is transmitted. This means the pilot may not be present at the receiver side all the time, and the recovery of the reference clock may be more complicated. One possible option according to embodiments is shown in FIG. 10B, which is similar to the embodiment of FIG. 10A and in which the voltage-controlled oscillator (VCO) 1227 of the PLL may be locked when no input is present. Depending on the stability of the PLL reference, the PLL loop bandwidth and the packet spacing, the drift of the frequency during off time of the transmitter may be acceptable, e.g. no more than a few Hz.

The embodiment of FIG. 1B can provide spatial stream combining with a pilot signal extracted on the receiver side using a bandpass filter and PLL with a VCO lock when no pilot signal is present. The OWC transmitter of Device 1 can be switched when a signal is ready for transmission by using an envelope detector and comparator.

Figure 11:
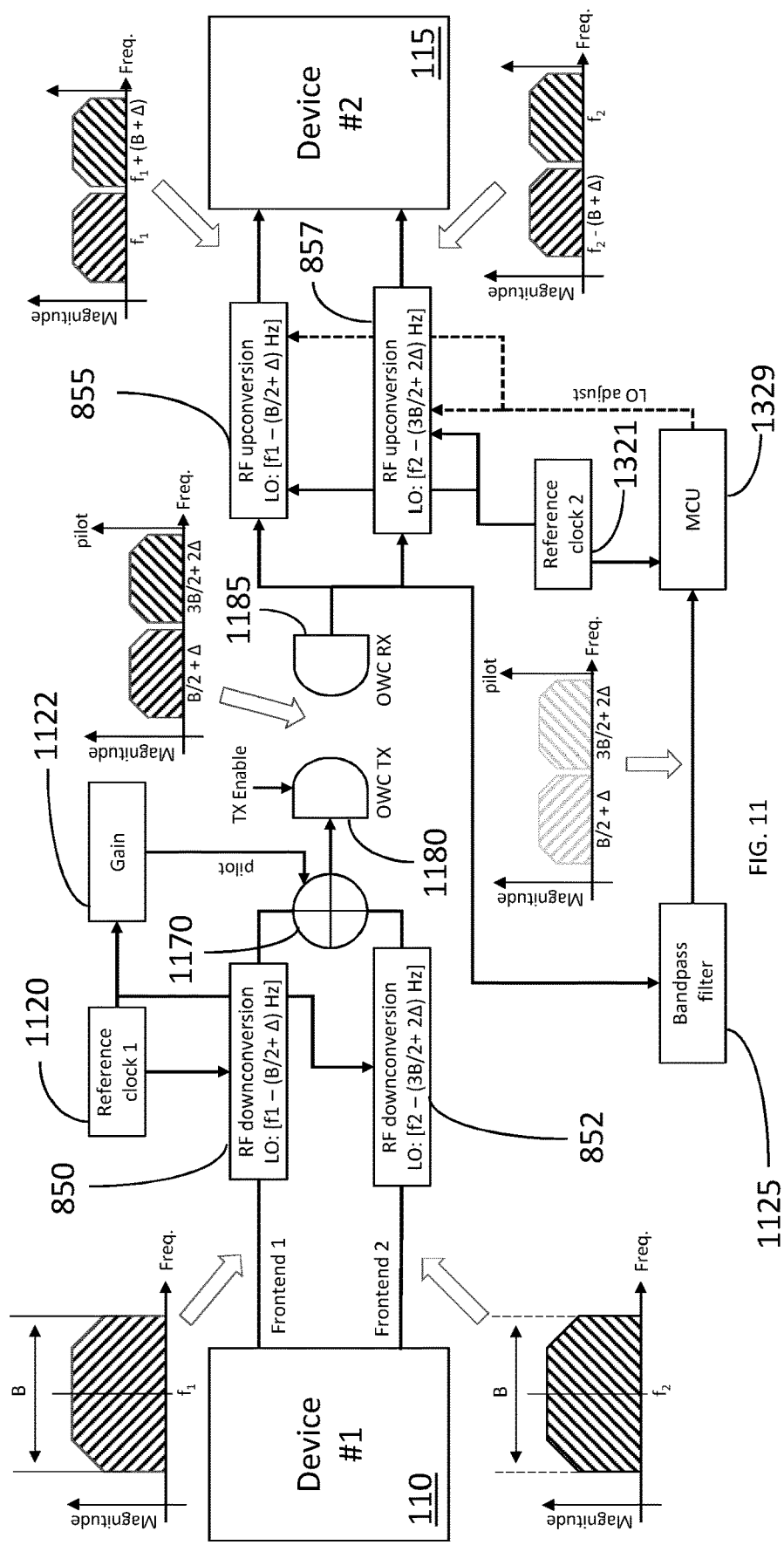
FIG. 11 is a schematic diagram of an optical wireless communication system according to a further embodiment.

A further solution for the receiver clock recovery is illustrated in FIG. 11, which is a schematic illustration of a further embodiment. According to embodiments, for example the embodiment of FIG. 11, a microcontroller unit (MCU) may be utilised to implement sophisticated estimation and correction algorithms that compare the received pilot signal against a local reference clock signal in order to generate adjustment signals for the RF up-conversion synthesizers, eliminating the frequency offset between the streams. The correction algorithms can be designed to operate with both continuous and intermittent pilot signals (e.g., by updating the estimator only when a pilot is received). This is different from the previous solutions where the recovered reference clock is utilised directly.

In the embodiment of FIG. 11 a microcontroller (MCU) at the receiver is used to implement frequency offset estimation and correction. The embodiment of FIG. 11 is similar to that of FIGS. 10A and 10B, and like reference numerals are used to refer to like features, but the embodiment of FIG. 11 includes MCU 1329 and additional bandpass filter 1125 and local reference clock 1321 components on the receive side. The MCU 1329 can be used to estimate a frequency difference between the pilot signal and the local oscillator(s) and correct it, as indicated schematically by the dashed lines in FIG. 11.

The embodiment of FIG. 11 can provide spatial stream combining with a pilot signal extracted on the receiver side using an MCU to estimate the frequency difference between the pilot signal and a digitally controlled oscillator and correct it.

A microcontroller unit (MCU) can also be provided in variants of any of the embodiments described and/or illustrated herein, if it is desired to provide control functions using such MCU. Any other suitable controller can be provided in other embodiments.

In further embodiments, the embodiments of FIGS. 9 to 11 are applicable to systems where direct modulation to IF is possible (for example, in similar manner to FIG. 5).

Transmitting the pilot at the same time as the data signal can reduce the dynamic range available to the data signal and this may reduce the performance of the system. To avoid this issue, the pilot and data signal may be transmitted at mutually exclusive time periods in some embodiments. The pilot may be transmitted as an intermittent burst or continuously during periods of no data signal transmission. Another solution according to some embodiments is to transmit the pilot over an alternative medium such as via a separate RF communication channel.

Channel Bonding/Aggregation

Figure 12:
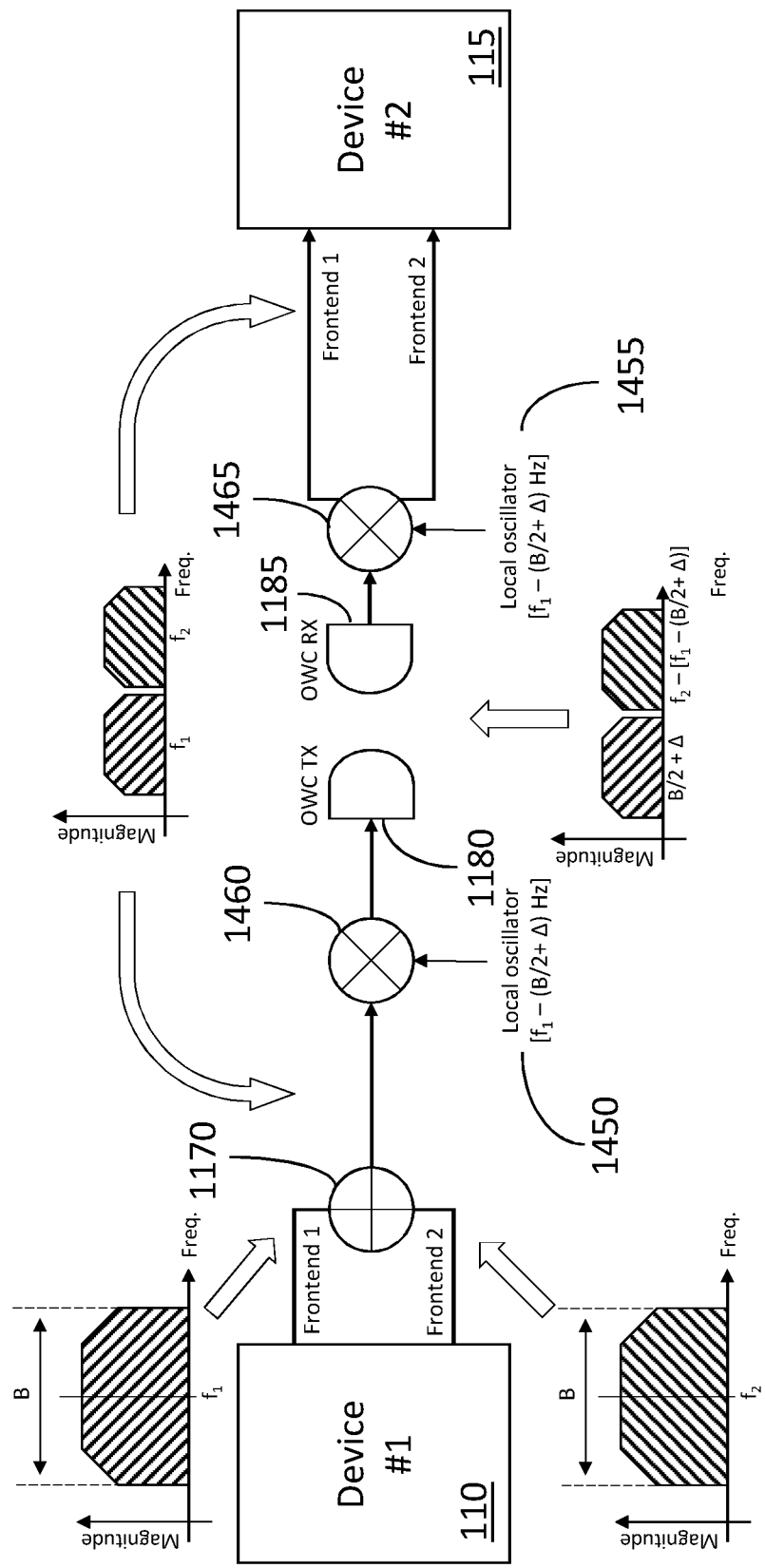
FIG. 12 is a schematic diagram of an optical wireless communication system according to a further embodiment.
Figure 13:
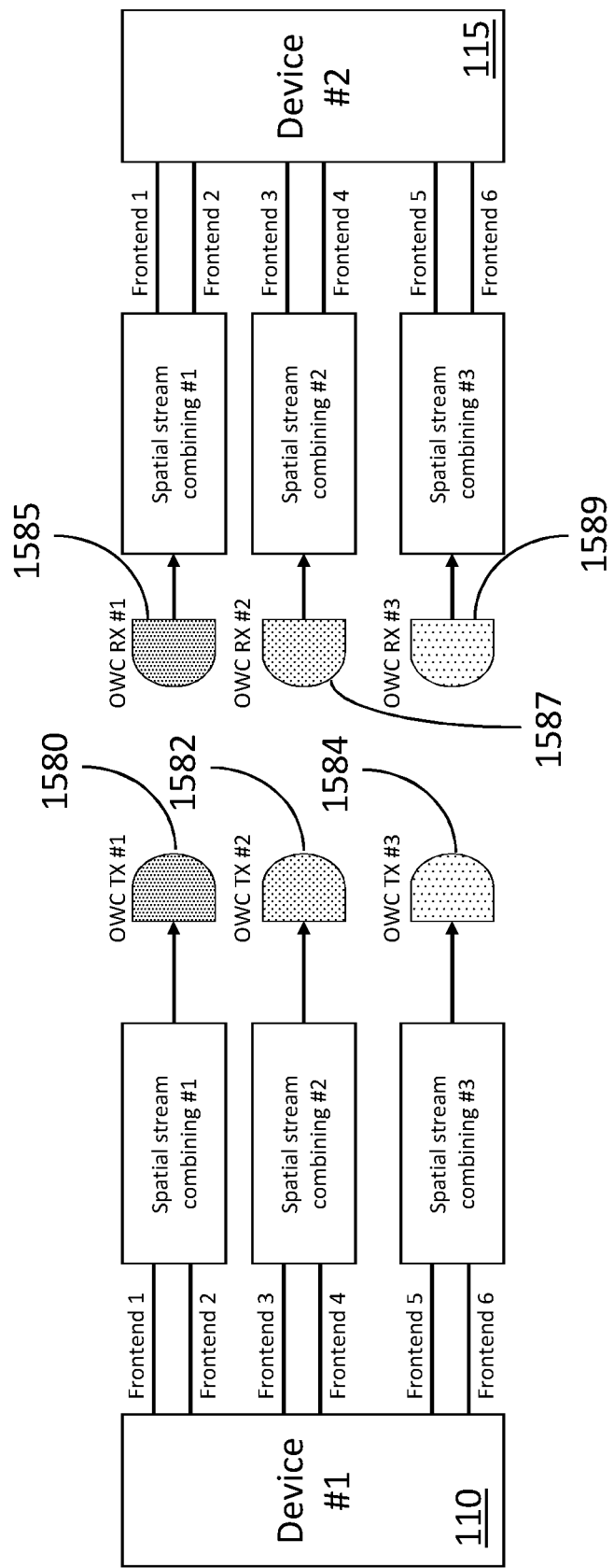
FIG. 13 is a schematic diagram of an optical wireless communication system according to a further embodiment.

Some baseband devices may support a form of channel aggregation where independent data signals with different carrier frequencies are transmitted from each of the frontends. One example of such a system may be a Wi-Fi baseband device operating in the 80+80 channel bandwidth mode where the first 80 MHz signal may be modulated with a first carrier frequency (e.g., channel 42: 5.21 GHz) while the second 80 MHz signal is modulated with a second, different carrier frequency (e.g., channel 58: 5.29 GHz).

Where the baseband device is capable of aggregating across channels that are located close to each other in the frequency domain (e.g., f2−f1=B+A, where A is a small number), an efficient implementation utilising just a single mixer device is possible in some embodiments, for example as illustrated schematically in FIG. 12.

In the embodiment of FIG. 12, signals from device 110, centred around frequencies f1 and f2 respectively, are provided to a summing amplifier 1170 then provide to a single mixer 1460, which also receives a signal from local oscillator 1450, and provided a combined signal to transmitter 1180 for transmission as a modulated light signal according to OWC techniques. On the receive side, the signals are separated out and provided to device 115 using mixer 1465 and local oscillator 1455.

The embodiment of FIG. 12 can provide channel aggregation for OWC. Each frontend operates at the same bandwidth but at different RF carrier frequency. A single mixer down-converts the combined signal to baseband for OWC.

Where the separation between the signal bands is much larger (f2−f1>>B), the approach utilised for spatial stream combining by the embodiment of FIG. 8 may be more appropriate to minimise wasted inter-channel spectrum.

WDM with Spatial Stream Combining

When a baseband device provides many MIMO channels (e.g., a massive MIMO system), it may not be possible to combine all of them into a single baseband signal as the OWC transceiver may not have sufficient bandwidth to support the combined bandwidth of all of the streams. Under such circumstances, the streams may be divided into multiple groups and the stream combining technique applied to each of the groups separately such that the combined bandwidth for each group is within the bandwidth limitation of the OWC transceiver. The combined signal from each group may then be communicated over OWC transceivers operating at different, non-overlapping wavelengths as illustrated schematically in FIG. 13, which shows a further embodiment. Respective combined signals are provided to transceivers 1580, 1582, 1584, which transmit them as modulated light signals in accordance with OWC techniques. The combined signals are received by transceivers 1585, 1587 and 1589 and the combined signals are separated out and provided to second device 115.

Communication Protocol Combining

Figure 14:
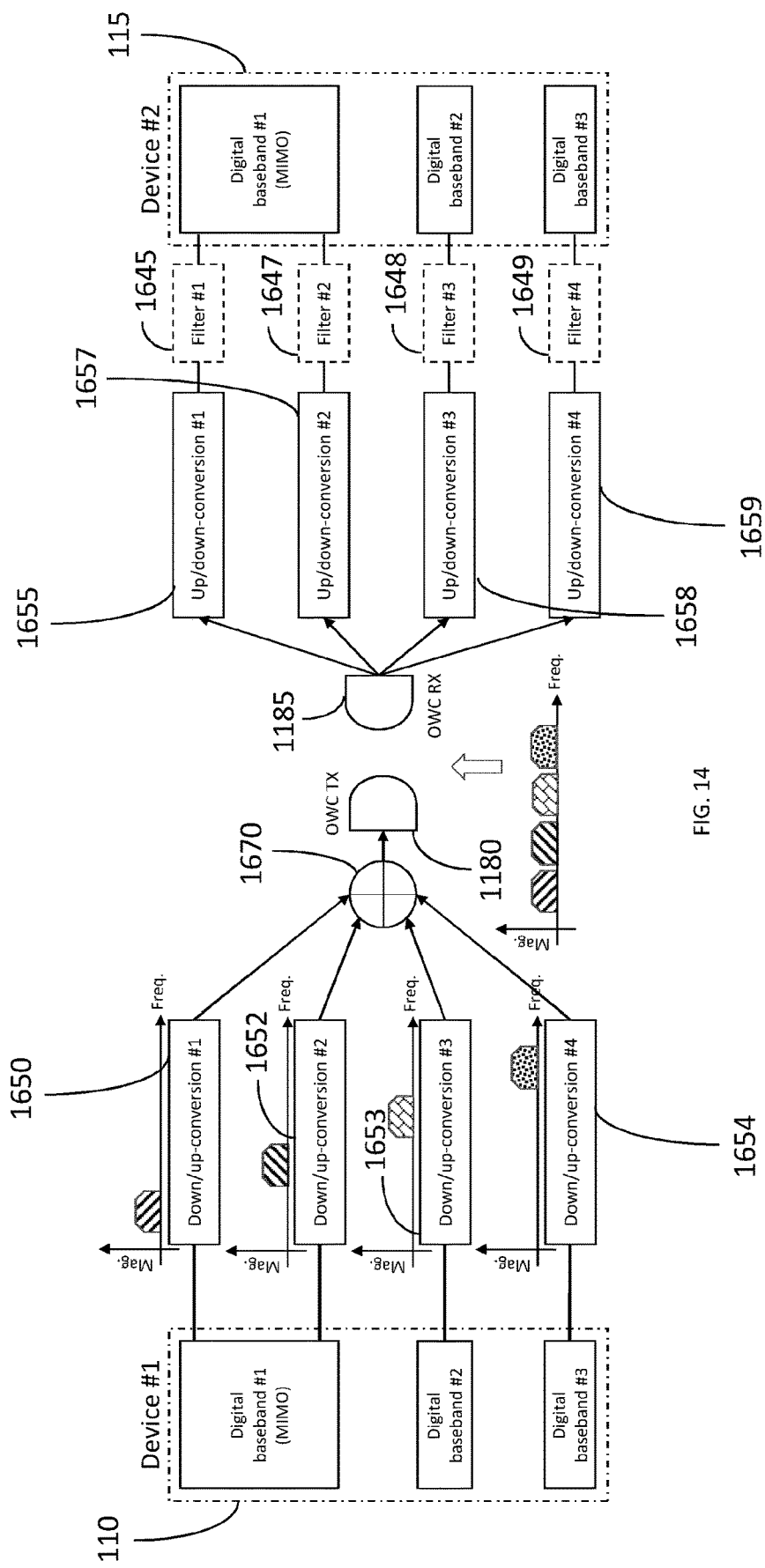
FIG. 14 is a schematic diagram of an optical wireless communication system according to a further embodiment.

The stream combining concept may also be used to aggregate multiple wireless communication signals (potentially originating from different digital basebands within a single device such as a handset) into a single wideband signal capable of being transmitted and received using a single OWC transceiver 1180, 1185 as illustrated schematically in FIG. 14 in accordance with an embodiment. The multiple wireless signals may be of the same (e.g., MIMO WiFi as described above) or different (e.g., LTE, Bluetooth, WiFi, ultrawide band, Wi-Gig, cellular or mm wave) communication protocols. In the embodiment of FIG. 14, the devices 110, 115 include respective digital baseband circuitry for each of the communication protocols. Down/up conversion components 1650, 1652, 1653, 1654 and amplifier or mixer 1670 on the transmit side, and up/down conversion components 1655, 1657, 1658, 1659 and filters 1645, 1647, 1648, 1649, are provided to process and combine the signals on the transmit side, and to process and separate the signals on the receive side. The embodiment of FIG. 14 includes transceivers 1180, 1185 for transmitting the signals as modulated light signals in accordance with OWC techniques.

While this concept is similar to existing methods of combining signals for transmission over a single RF antenna (e.g., 2.4 GHz and 5 GHz WiFi), the frequency up/down-conversion method allows the signals to be positioned much closer together—improving bandwidth efficiency.

Once received by the OWC receiver and up/down-converted back to the appropriate centre frequency, each of the signals may be filtered by the filters 1645, 1647, 1648, 1649 for improved performance before being fed into the relevant digital baseband(s) components.

As before, the signals may be RF, IF, or an I/Q baseband.

In a variant of the embodiment of FIG. 14, the digital baseband MIMO device in device 101 may, for example, be replaced with a non-MIMO device such that the three (or any other suitable number) of devices (e.g. individual digital baseband circuitries) included in device 101 together provided multiple inputs and multiple outputs with each individual one of those devices (e.g. individual digital baseband circuitries) having, for example, a single input and/or single output.

LiFi Redundancy and/or Enhancement for Wi-Fi

An 802.11 chip operating in 2×2 MIMO mode using STBC and enabled for both Wi-Fi and LiFi can provide redundancy and robustness. A first stream is connected to an RF front end, the second stream to the optical front end. Each stream contains the full information being transferred. Therefore, if Wi-Fi drops out, data can go over the optical path. If LiFi drops out, data can go over the RF path. If Wi-Fi and LiFi are present, robustness and throughput are improved.

This can be generalised to an N×N MIMO system where a number of streams can be used for RF/Wi-Fi and a subset of the remaining streams can be used for OWC/LiFi.

This idea avoids switching between different front ends and allows a smooth handover from LiFi to Wi-Fi and reverse in case one of them fades away.

The system can also be used for sending different data to different users over different subsets of the channels based on user capabilities (what they can receive and transmit), signal strength or level of security of the user and/or data. For example, more secure data can be sent via LiFi while less secure data can be sent via Wi-Fi to the same or different users.

Use of MIMO Channels to Drive Independent Remote-Optical-Heads

Figure 15:
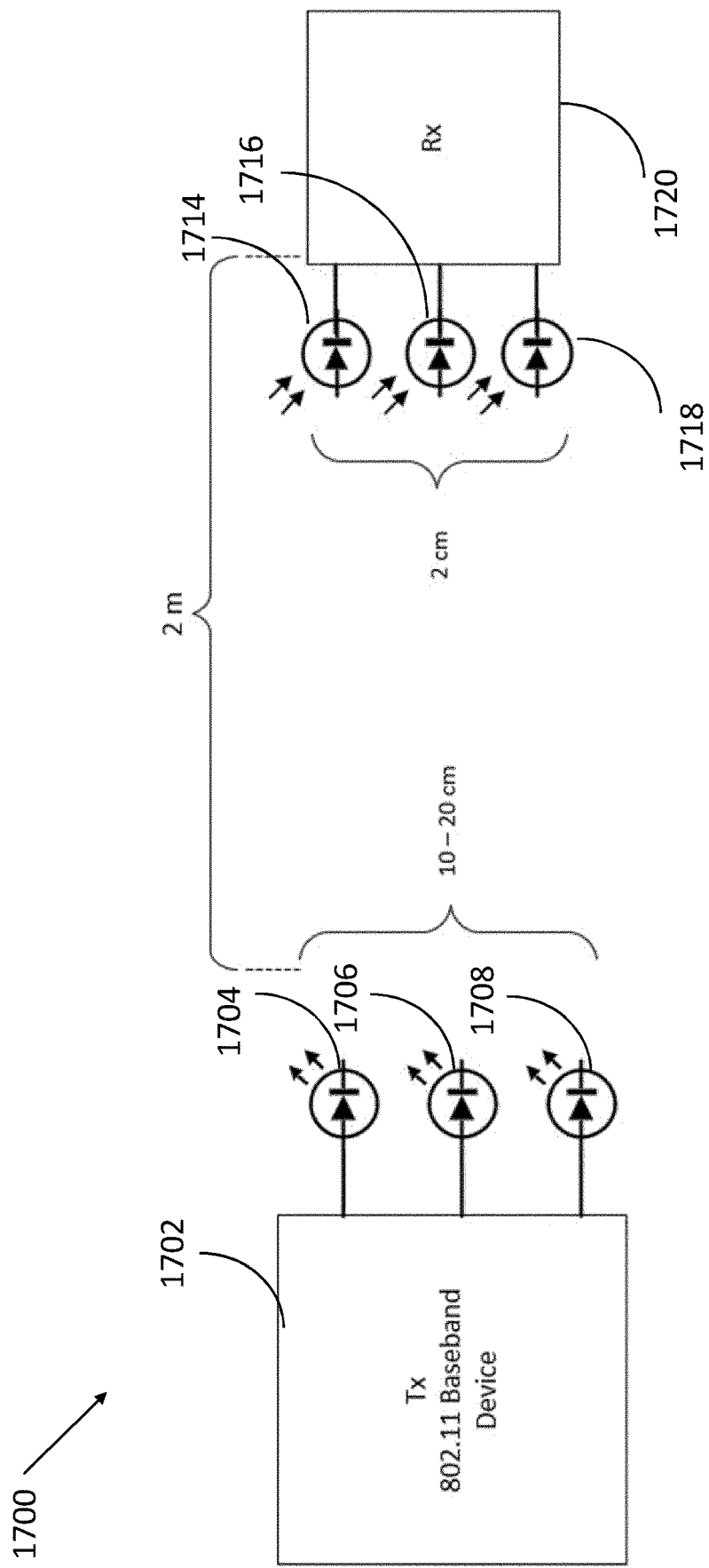
FIG. 15 is a schematic diagram of an optical wireless communication system according to a further embodiment.

A single 802.11 baseband device with MIMO functionality can also be used to drive multiple, spatially separate/remote optical front ends (OFEs) with either the same or different data across the same (signal) frequency and wavelength, as illustrated schematically in FIG. 15. Different gain on each channel will allow the channels to be distinguished. In other words, a non-singular channel matrix H will be produced. The gain at a given receiver Rx based on the geometry of the system h can be estimated in relation to the angle of emergence with respect to the transmitter $Tx_i$ φ, the angle of incidence with respect to the receiver $Rx_j$ ψ and the distance between $Tx_i$ and $Rx_i$ d.

$$h = \begin{cases} \frac{(k+1)A}{2\pi d^2} \cos^k(\varphi)\cos(\psi) & 0 \le \psi \le \Psi_{1/2} \\ 0 & \psi > \Psi_{1/2} \end{cases}$$

A is the detector area. k is of the order $$k = \frac{-\ln(2)}{\ln(\cos(\Phi_{1/2}))},$$

and $\phi_{1/2}$ and $\psi_{1/2}$ are the transmitter and receiver semiangle (at half power) respectively.

FIG. 15 shows a configuration of a baseband device 1702 with multiple outputs, transmitted using transmitter LEDs 1704, 1706, 1708 and received by receivers 1714, 1716, 1718 of a system 1700 according to an embodiment. The receiver signals from the receivers 1714, 1716, 1718 are provided to a receiver device 1720 for subsequent processing. The proximity of the output transmitters 1704, 1706, 1708 (separated by 10 cm to 20 cm in the embodiment of FIG. 15) may provide for almost complete overlap in coverage area and hence the gain across the channels are very similar. In this case, each individual channel cannot be distinguished.

Figure 16:
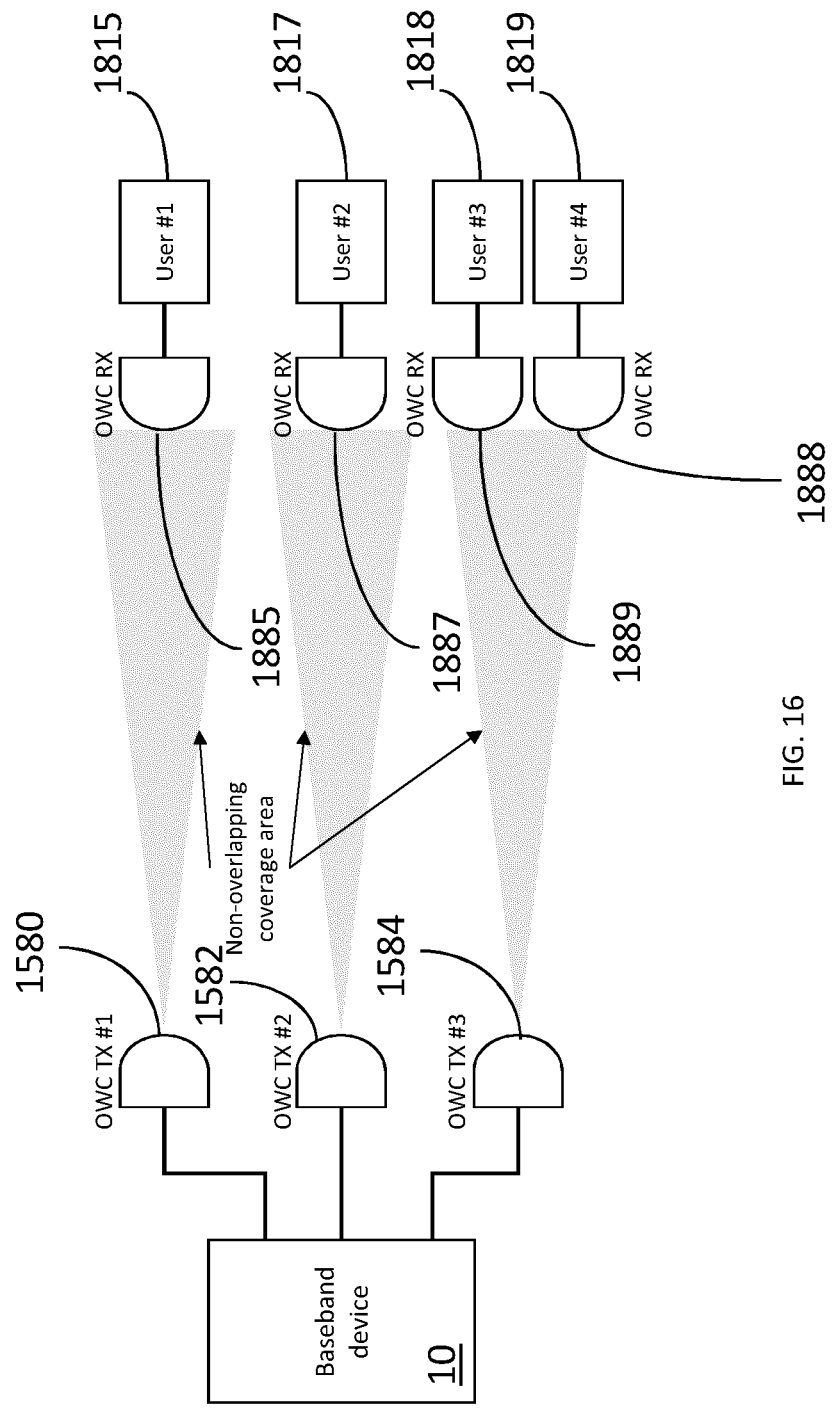
FIG. 16 is a schematic diagram of an optical wireless communication system according to a further embodiment.

As an alternative, the MIMO channels may be spatially separated such that each channel covers a non-overlapping area of space as shown in FIG. 16, which is a schematic illustration of a further embodiment, in which transceivers 1580, 1582, 1584 are connected too baseband device 10 and provide coverage areas, for example, at least some of which are non-overlapping and that are used to communicate with respective transceivers 1885, 1887, 1889, 1888 of users 1815, 1817, 1818, 1819. When utilised in conjunction with MU-MIMO functionality, this allows a single baseband device to serve multiple users simultaneously across a much larger space which may be beneficial from a cost perspective. If MU-MIMO is unavailable, the users in each area will be served in turn instead in a TDMA fashion.

It should be appreciated that variations of the spatial stream combining method described previously can also be applied here to enhance per-user throughput (i.e., multiple channels are combined for each spatially separated OWC transceiver).

A variation of this concept is where a number of the MIMO channels/streams are connected to OWC frontends while the others may be connected to a standard RF antenna. Such as system would allow a single baseband device to serve both OWC and RF users simultaneously with independent data streams (unlike the previous concept where redundancy is achieved by transmitting the same data over OWC and RF).

Aggregate Multiple, Narrow BW Channels with Independent MCS & Power Loading to Emulate Bit and Power Loading An ideal communication channel is flat. However, in reality the channel is not flat. This is because of factors such as interference and fading with signal strength and SNR varying across the full width of the channel. The performance of a system can be improved by applying bit and power loading unevenly across multiple narrow bandwidth subchannels which together comprise the entire communication channel, effectively weighting the signal received at different narrow subchannels based on the known or estimated SNR and known or estimated attenuation of a given subchannel.

FIG. 27 shows a) ideal channel performance b) real-world channel performance due to factors such as interference and fading c) bit and power loading across narrow bandwidth subchannels to compensate for variation in performance across full bandwidth.

Wi-Fi typically does not support power loading. In Wi-Fi, coding and modulation scheme are also fixed across the whole channel. This does not provide optimal use of modulation schemes across the channel bandwidth.

The concept of spatial stream combining presents a mechanism for emulating bit and power loading as each individual spatial stream can be considered as a single narrowband subchannel. Multiple spatial streams (narrowband subchannels) can therefore be aggregated using concepts or techniques described in accordance with embodiments to yield the complete communication bandwidth where bit and power loading has been effectively applied across different segments of that communication bandwidth.

In order to optimise the use of each spatial stream (narrowband subchannel), independent modulation and coding schemes (MCS) and power loading can be used for narrow bandwidth subchannels across the whole bandwidth to emulate bit and power loading. Aggregation can then combine the narrowbands into one spectrum. Different power loading will distinguish between the different channel gains (i.e. power loading), and the MCS chosen can be adapted to a given narrow subchannel based on its characteristics. For example, if a subchannel is weak, with low SNR, use an appropriate scheme that may support a more robust communication link (e.g. 4QAM rather than 64QAM).

Some level of automatic adaptation (selection of appropriate MCS for each narrowband subchannel) is inherently built into the protocol as the baseband device already uses training and feedback to determine the correct MCS for each spatial stream. The same training information can also be used to subsequently apply power loading to each spatial stream.

This concept can also be used to serve multiple users via different narrowband subchannels.

Further Features

The following features may be provided in certain embodiments.

MIMO Spatial Stream Combining.

There may be provided an OWC system:
that combines multiple spatial streams
Generated by MIMO enabled baseband device
And the multiple spatial streams are combined to yield a single baseband signal
The single baseband signal transmitted and/or received by a single wide band OWC transmitter/receiver.

The following features may alternatively or additionally be provided:
channel aggregation in which independent data signals with different carrier frequencies are transmitted from each of the TXs
Spatial stream combining utilises one or more mixer devices
Using a baseband device operating at 80+80 channel bandwidth mode
Wi-Fi baseband
First 80 MHz modulated with a first carrier frequency, second 80 MHz modulated with a second carrier frequency The following features may alternatively or additionally be provided:
Where at least one of the multiple spatial streams is down-converted
And/or at least one of the multiple spatial streams is up-converted
OWC TX/RX supports a bandwidth at least as large as the total bandwidth of the combined single bandwidth signal.
Can support any number of spatial streams
Small guard band between each of the signal bands
Guard band an integer multiple of the subcarrier spacing
Signal bands are non-overlapping
Combining of signal band is in the electrical domain.

Alternatively or additionally there may be provided an OWC system:
that combines multiple spatial streams
Generated by MIMO enabled baseband device
Multiple spatial streams may be divided into multiple groups and a stream combining technique is applied to each of the groups separately such that the combined bandwidth for each group is within the bandwidth limitation of the OWC transceiver.
The combined signal from each group may then be communicated over OWC transceivers operating at different, non-overlapping wavelengths (bullet for transmitters, bullet for receivers)

Alternatively or additionally there may be provided an OWC system where:
One MIMO baseband chip is enabled for RF and OWC.
At least one stream connected to an RF front end (TX and/or RX)
At least one stream connected to an OWC front end (TX and/or RX)
The following features may alternatively or additionally be provided:
RF is Wi-Fi and/or OWC is LiFi
2×2 MIMO or greater.
Any combination of subsets of streams connected to RF/OWC
Providing redundancy where each stream contains full information being transferred
Sending different data to different or same users over different subsets of channels based on:
User capabilities (ie what they are capable of receiving transmitting/OWC enabled vs not OWC enabled)
Signal strength
Level of security of either/both the user or the data
More secure transmission over OWC
If Wi-Fi drops out, data can go over optical path and vice versa (one/both enabled at a given time)
Handover based on signal fading on RF or OWC
Enabled using STBC
An 802.11 chip
Use of MIMO Channels to Drive Independent Remote-Optical-Heads.

Alternatively or additionally there may be provided an OWC System that:
uses a MIMO enabled based band device
to drive multiple OWC optical front ends (TX and/or RX) with substantially non-overlapping coverage areas
The following features may alternatively or additionally be provided:
Same or different data across the same frequency and wavelength.
Used in conjunction with MU-MIMO
Serves multiple users simultaneously
Multiple users served in turn
Combined with spatial stream combining methods and RF/OWC methods
Aggregate Multiple, Narrow BW Channels with Independent MCS & Power Loading to Emulate Bit and Power Loading.

Alternatively or additionally there may be provided an OWC System that:
uses a MIMO enabled baseband device
The baseband device supporting a number of spatial streams
A plurality of spatial streams have their individual MCS and/or power levels set independently/differently
Where the plurality of spatial streams are aggregated to form a single communication channel.
The following features may alternatively or additionally be provided:
Power loading and MCS are applied independently
Choice of MCS is based on link quality of each spatial stream
Choice of power loading is based on link quality of each spatial stream
MCS can be chosen based on SNR, eg 4 QAM et 64QAM
Choice can be dynamic and/or automated
MCS choice based on training and system feedback
Training information can be used for power loading application (optionally after choice of MCS)
used to serve multiple users.
802.11 chips may be used by any or all of the OWC systems.

A skilled person will appreciate that variations of the described embodiments are possible without departing from the invention. Accordingly, the above description of specific embodiments is provided by way of example only and not for the purposes of limitation. It will be clear to the skilled person that modifications may be made to the embodiments without departing from the scope of the invention.

The invention claimed is:

1. An optical wireless communication (OWC) system comprising:
a multiple input multiple output (MIMO) device configured to provide a plurality of signals each representing a respective data stream of a plurality of data streams;
conditioning circuitry configured to receive the plurality of signals from the MIMO device and process the plurality of signals to produce at least one conditioned signal representative of the data streams and suitable for transmission using an OWC transmission device; and
an OWC transmission device comprising at least one transmitter for transmitting light and configured to be responsive to the at least one conditioned signal to transmit light representative of the data streams using the at least one transmitter,
wherein the data streams comprise at least a first data stream and a second data stream, and the at least one conditioned signal produced by the conditioning circuitry comprises a conditioned signal that includes a first portion having a first OWC frequency or a first range of OWC frequencies and at least a second portion having at least a second OWC frequency or a second range of OWC frequencies,
wherein the first portion represents the first data stream and the second portion represents the second data stream, and wherein the conditioning circuitry is configured to perform at least one frequency conversion process, and
wherein the at least one conditioned signal comprises at least one baseband signal and/or at least one intermediate frequency signal between baseband and RF.

2. A system according to claim 1, wherein the data streams comprise a plurality of different spatial streams that are intended or suitable for transmission by antennas or other transmitters at different spatial locations.

3. A system according to claim 1, wherein at least one of:
the MIMO device comprises a MIMO device intended for use with radio-frequency (RF) transmission circuitry; or
the MIMO device comprises a device operating in accordance with 802.11 standard; or
the MIMO device comprises a MIMO baseband device and an RF integrated circuit.

4. A system according to claim 1, wherein the at least one transmitter for transmitting light comprises a single transmitter for transmitting light.

5. A system according to claim 1, wherein the first range of OWC frequencies and the second range of OWC frequencies are non-overlapping.

6. A system according to claim 5, wherein the first range of OWC frequencies and the second range of OWC frequencies are separated by a further range of OWC frequencies, optionally a guard band.

7. A system according to claim 6, wherein the first range of OWC frequencies and/or the second range of OWC frequencies include sub-carriers separated by a frequency spacing, and the guard band has a width equal to an integer multiple of said frequency spacing of the sub-carriers.

8. A system according to claim 1, wherein each of the first range of OWC frequencies and the second range of OWC frequencies represent or comprise a respective sub-channel within a useable OWC bandwidth of the OWC transmission device.

9. A system according to claim 1, wherein the MIMO device is such that at least one or more of the plurality of MIMO device output signals output by the MIMO device uses a different frequency or frequency range to those used by the OWC transmission device.

10. A system according to claim 9, wherein the MIMO device output signals use frequencies that are higher than desired OWC frequencies and the conditioning circuitry is configured to perform a down-conversion process; and/or
the MIMO device output signals use frequencies that are lower than the desired OWC frequencies and the conditioning circuitry is configured to perform an up-conversion process.

11. A system according to claim 1,
wherein the conditioning circuitry is configured to add to or associate with the at least one conditioned signal a clock signal or other timing signal, and
wherein the clock signal or other timing signal is included in or associated with a pilot signal.

12. A system according to claim 1, wherein the plurality of MIMO device output signals output from the MIMO device comprise at least a first signal and a second signal, the first signal and the second signal each representing its respective data stream using a same frequency or range of frequencies.

13. A system according to claim 1, wherein the plurality of signals output from the MIMO device comprise at least a first signal and a second signal, and
wherein the conditioning circuitry is configured to shift each of the first and second signals to baseband or to intermediate frequencies and to represent the first signal using a first range of OWC frequencies and to represent the second signal using at least a second, different range of OWC frequencies.

14. A system according to claim 1,
wherein the plurality of MIMO device output signals output from the MIMO device comprise at least a first signal and a second signal, and
wherein the first signal and the second signal each represents its respective data stream using a different MIMO device frequency or range of MIMO device frequencies.

15. A system according to claim 14, wherein the first signal and the second signal have different carrier frequencies, thereby providing a channel separation between the first signal and the second signal that are output from the MIMO device.

16. A system according to claim 15, wherein the conditioning circuitry is configured to provide a down-conversion of the first and second signals to baseband or to intermediate frequencies that maintains the channel separation of the first signal and the second signal in a resulting baseband or intermediate frequency conditioned signal.

17. A system according to claim 1, wherein the conditioning circuitry is configured to divide the plurality of MIMO device output signals from the MIMO device into a plurality of OWC groups and to perform a respective conditioning process for each of the OWC groups.

18. A system according to claim 17, wherein each OWC group comprises a single one of the at least one conditioned signal, or each OWC group comprises a respective plurality of the MIMO device output signals from the MIMO device.

19. A system according to claim 1, wherein the at least one transmitter of the OWC transmission device comprises a plurality of transmitters and the conditioning circuitry is configured to provide, for each of the transmitters, a respective different one of the at least one conditioned signal data streams of the respective different one of the at least one conditioned signal are transmitted by different ones of the transmitters.

20. A system according to claim 19, wherein at least one of the plurality of the transmitters is configured to transmit light of different wavelength(s) to at least one other of the transmitters.

21. A system according to claim 1, wherein the OWC system further comprises an RF transmission device comprising at least one RF antenna.

22. The optical wireless communication (OWC) system of claim 1 further comprising:
an OWC receiver device comprising at least one receiver for receiving light and for generating at least one received OWC signal from the received light representing a plurality of data streams; and
conditioning circuitry configured to receive at least one OWC signal representing the data streams from the OWC receiver device and to process the at least one received OWC signal thereby to produce a plurality of conditioned signals to provide as input signals to a multiple input multiple output (MIMO) device,
wherein the MIMO device is configured to receive the plurality of conditioned signals each representing a respective data stream of the plurality of data streams.

23. An optical wireless communication (OWC) method comprising:
obtaining a plurality of MIMO device output signals each representing a respective data stream from a MIMO device comprising a baseband device configured to generate modulated baseband signals, wherein the plurality of MIMO device output signals comprise electrical signals and have MIMO device output signal frequencies, the MIMO device output signal frequencies comprising baseband or RF or intermediate frequencies wherein each MIMO device output signal represents a respective data stream of a plurality of data streams;
processing the plurality of MIMO device output signals with signal conditioning circuitry to produce at least one conditioned signal representative of the data stream and suitable for transmission using an OWC transmission device; and
receiving by an OWC transmission device the at least one conditioned signal and in response transmitting light representative of the data streams using at least one transmitter,
wherein the plurality of data streams comprise at least a first data stream and a second data stream,
wherein the at least one conditioned signal produced by the signal conditioning circuitry comprises a conditioned signal that includes a first portion having a first OWC frequency or first range of OWC frequencies and at least a second portion having a second OWC frequency or a second range of OWC frequencies, and
wherein the first portion represents the first data stream and the second portion represents the second data stream.

24. An optical wireless communication (OWC) system comprising:
- a multiple input multiple output (MIMO) device configured to provide a plurality of signals each representing a respective data stream;
- conditioning circuitry configured to receive the plurality of signals from the MIMO device and process the plurality of signals to produce at least one conditioned signal representative of the data stream and suitable for transmission using an OWC transmission device; and
- an OWC transmission device comprising at least one transmitter for transmitting light and configured to be responsive to the at least one conditioned signal to transmit light representative of the data stream using the at least one transmitter,
- wherein the data stream comprise at least a first data stream and a second data stream, and the at least one conditioned signal produced by the conditioning circuitry comprises a conditioned signal that includes a first portion having a first OWC frequency or a first range of OWC frequencies and at least a second portion having at least a second OWC frequency or a second range of OWC frequencies,
- wherein the first portion represents the first data stream and the second portion represents the second data stream, and wherein the conditioning circuitry is configured to perform at least one frequency conversion process, and
- wherein the MIMO device is such that at least one or more of the plurality of MIMO device output signals output by the MIMO device uses a different frequency or frequency range to those used by the OWC transmission device.

25. A system according to claim 24, wherein the MIMO device uses frequencies that are higher than desired OWC frequencies and the conditioning circuitry is configured to perform a down-conversion process; and/or
the MIMO device uses frequencies that are lower than the desired OWC frequencies and the conditioning circuitry is configured to perform an up-conversion process.

26. An optical wireless communication (OWC) system comprising:
- a multiple input multiple output (MIMO) device configured to provide a plurality of signals each representing a respective data stream;
- conditioning circuitry configured to receive the plurality of signals from the MIMO device and process the plurality of signals to produce at least one conditioned signal representative of the data stream and suitable for transmission using an OWC transmission device; and
- an OWC transmission device comprising at least one transmitter for transmitting light and configured to be responsive to the at least one conditioned signal to transmit light representative of the data stream using the at least one transmitter,
- wherein the data stream comprise at least a first data stream and a second data stream, and the at least one conditioned signal produced by the conditioning circuitry comprises a conditioned signal that includes a first portion having a first OWC frequency or a first range of OWC frequencies and at least a second portion having at least a second OWC frequency or a second range of OWC frequencies,
- wherein the first portion represents the first data stream and the second portion represents the second data stream, and wherein the conditioning circuitry is configured to perform at least one frequency conversion process,
- wherein the conditioning circuitry is configured to add to or associate with the at least one conditioned signal a clock signal or other timing signal, and
- wherein the clock signal or other timing signal is included in or associated with a pilot signal.

27. An optical wireless communication (OWC) system comprising:
- a multiple input multiple output (MIMO) device configured to provide a plurality of signals each representing a respective data stream of a plurality of data streams;
- conditioning circuitry configured to receive the plurality of signals from the MIMO device and process the plurality of signals to produce at least one conditioned signal representative of the data streams and suitable for transmission using an OWC transmission device; and
- an OWC transmission device comprising at least one transmitter for transmitting light and configured to be responsive to the at least one conditioned signal to transmit light representative of the data streams using the at least one transmitter,
- wherein the data streams comprise at least a first data stream and a second data stream, and the at least one conditioned signal produced by the conditioning circuitry comprises a conditioned signal that includes a first portion having a first OWC frequency or a first range of OWC frequencies and at least a second portion having at least a second OWC frequency or a second range of OWC frequencies,
- wherein the first portion represents the first data stream and the second portion represents the second data stream, and wherein the conditioning circuitry is configured to perform at least one frequency conversion process, and
- wherein the conditioning circuitry is configured to divide the plurality of MIMO device output signals from the MIMO device into a plurality of OWC groups and to perform a respective conditioning process for each of the OWC groups.

28. A system according to claim 27, wherein each OWC group comprises a single one of the at least one conditioned signal, or each OWC group comprises a respective plurality of the MIMO device output signals from the MIMO device.

29. An optical wireless communication (OWC) system comprising:
- a multiple input multiple output (MIMO) device configured to provide a plurality of signals each representing a respective data stream;
- conditioning circuitry configured to receive the plurality of signals from the MIMO device and process the plurality of signals to produce at least one conditioned signal representative of the data stream and suitable for transmission using an OWC transmission device; and
- an OWC transmission device comprising at least one transmitter for transmitting light and configured to be responsive to the at least one conditioned signal to transmit light representative of the data stream using the at least one transmitter,
- wherein the data stream comprise at least a first data stream and a second data stream, and the at least one conditioned signal produced by the conditioning circuitry comprises a conditioned signal that includes a first portion having a first OWC frequency or a first range of OWC frequencies and at least a second portion having at least a second OWC frequency or a second range of OWC frequencies,
wherein the first portion represents the first data stream and the second portion represents the second data stream, and wherein the conditioning circuitry is configured to perform at least one frequency conversion process, and
wherein the OWC system further comprises an RF transmission device comprising at least one RF antenna.

30. An optical wireless communication (OWC) system comprising:
a multiple input multiple output (MIMO) device comprising a baseband device configured to generate modulated baseband signals wherein the MIMO device is configured to provide a plurality of MIMO device output signals wherein the plurality of MIMO device output signals comprise electrical signals having MIMO device output signal frequencies, the MIMO device output signal frequencies comprising baseband or RF or intermediate frequencies each MIMO device output signal representing a respective data stream of a plurality of data streams;
conditioning circuitry comprising electrical circuitry configured to receive the plurality of MIMO device output signals from the MIMO device and perform at least one frequency up conversion process or frequency down conversion process on one or more of the plurality of MIMO device output signals and process the plurality of MIMO device output signals to produce at least one conditioned signal representative of the data streams and suitable for transmission using an OWC transmission device; and
an OWC transmission device comprising at least one transmitter for transmitting light and configured to be responsive to the at least one conditioned signal to transmit light representative of the data streams using the at least one transmitter,
wherein the plurality of data streams comprise at least a first data stream and a second data stream,
wherein the at least one conditioned signal produced by the conditioning circuitry comprises a conditioned signal that includes a first portion having a first OWC frequency or a first range of OWC frequencies and at least a second portion having at least a second OWC frequency or a second range of OWC frequencies, and
wherein the first portion represents the first data stream and the second portion represents the second data stream.

31. An optical wireless communication (OWC) system comprising:
a multiple input multiple output (MIMO) device comprising a baseband device configured to generate modulated baseband signals, wherein the MIMO device is configured to provide a plurality of MIMO device output signals, wherein the plurality of MIMO device output signals comprise electrical signals having MIMO device output signal frequencies, and wherein the MIMO device output signal frequencies comprise baseband, RF, or intermediate frequencies each MIMO device output signal representing a respective data stream of a plurality of data streams;
conditioning circuitry comprising electrical circuitry configured to receive the plurality of MIMO device output signals from the MIMO device and perform at least one frequency up conversion process or frequency down conversion process on one or more of the plurality of MIMO device output signals and process the plurality of MIMO device output signals to produce at least one conditioned signal representative of the data streams and suitable for transmission using an OWC transmission device; and
an OWC transmission device comprising at least one transmitter for transmitting light and configured to be responsive to the at least one conditioned signal to transmit light representative of the data streams using the at least one transmitter,
wherein the plurality of data streams comprise at least a first data stream and a second data stream,
wherein the at least one conditioned signal produced by the conditioning circuitry comprises a conditioned signal that includes a first portion having a first OWC frequency or a first range of OWC frequencies and at least a second portion having at least a second OWC frequency or a second range of OWC frequencies, and
wherein the first portion represents the first data stream and the second portion represents the second data streams and wherein the conditioning circuitry is configured to add or associate with the at least one conditioned signal a clock signal or other timing signal.

32. A system according to claim 31, wherein the data streams comprise a plurality of different spatial streams that are intended or suitable for transmission by antennas or other transmitters at different spatial locations.

33. A system according to claim 31, wherein at least one of:
the MIMO device comprises a MIMO device intended for use with radio-frequency (RF) transmission circuitry; or
the MIMO device comprises a device operating in accordance with 802.11 standard; or
the MIMO device comprises a MIMO baseband device and an RF integrated circuit.

34. A system according to claim 31, wherein the first range of OWC frequencies and the second range of OWC frequencies are non-overlapping.

35. A system according to claim 34, wherein the first range of OWC frequencies and the second range of OWC frequencies are separated by a further range of OWC frequencies, optionally a guard band.

36. A system according to claim 35, wherein the first range of OWC frequencies and/or the second range of OWC frequencies include sub-carriers separated by a frequency spacing, and the guard band has a width equal to an integer multiple of said frequency spacing of the sub-carriers.

37. A system according to claim 31, wherein each of the first range of OWC frequencies and the second range of OWC frequencies represent or comprise a respective sub-channel within a useable OWC bandwidth of the OWC transmission device.

38. A system according to claim 31, wherein the MIMO device is such that at least one or more of the plurality of MIMO device output signals output by the MIMO device uses a different frequency or frequency range to those used by the OWC transmission device.

39. A system according to claim 38, wherein the MIMO device uses frequencies that are higher than desired OWC frequencies and the conditioning circuitry is configured to perform a down-conversion process; and/or
the MIMO device uses frequencies that are lower than the desired OWC frequencies and the conditioning circuitry is configured to perform an up-conversion process.

40. A system according to claim 31, wherein the plurality of MIMO device output signals output from the MIMO device comprise at least a first signal and a second signal, the first signal and the second signal each representing its respective data stream using a same frequency or range of frequencies.

41. A system according to claim 31, wherein the plurality of signals output from the MIMO device comprise at least a first signal and a second signal, and
    wherein the conditioning circuitry is configured to shift each of the first and second signals to baseband or to intermediate frequencies and to represent the first signal using a first range of OWC frequencies and to represent the second signal using at least a second, different range of OWC frequencies.

42. A system according to claim 31,
    wherein the plurality of MIMO device output signals output from the MIMO device comprise at least a first signal and a second signal,
    wherein the first signal and the second signal each represents its respective data stream using a different MIMO device frequency or range of MIMO device frequencies, and
    wherein the first signal and the second signal have different carrier frequencies, thereby providing a channel separation between the first signal and the second signal that are output from the MIMO device.

43. A system according to claim 42, wherein the conditioning circuitry is configured to provide a down-conversion of the first and second signals to baseband or to intermediate frequencies that maintains the channel separation of the first signal and the second signal in a resulting baseband or intermediate frequency conditioned signal.

44. A system according to claim 31, wherein the conditioning circuitry is configured to divide the plurality of MIMO device output signals from the MIMO device into a plurality of OWC groups and to perform a respective conditioning process for each of the OWC groups.

45. A system according to claim 31, wherein the at least one transmitter of the OWC transmission device comprises a plurality of transmitters and the conditioning circuitry is configured to provide, for each of the transmitters, a respective different one of the at least one conditioned signal so that data streams of the respective different one of the at least one conditioned signal are transmitted by different ones of the transmitters.

46. A system according to claim 45, wherein at least one of the plurality of the transmitters is configured to transmit light of different wavelength(s) to at least one other of the transmitters.

47. A system according to claim 31, wherein the OWC system further comprises an RF transmission device comprising at least one RF antenna.

48. The optical wireless communication (OWC) system of claim 31, further comprising:
    an OWC receiver device comprising at least one receiver for receiving light and for generating at least one received OWC signal from the received light representing a plurality of data streams; and
    conditioning circuitry configured to receive at least one OWC signal representing the data streams from the OWC receiver device and to process the at least one received OWC signal thereby to produce a plurality of conditioned signals to provide as input signals to a multiple input multiple output (MIMO) device,
    wherein the MIMO device is configured to receive the plurality of conditioned signals each representing a respective data stream of the plurality of data streams.

49. A system according to claim 31, wherein the clock signal or other timing signal is included in or associated with a pilot signal.

* * * * *

UNITED STATES PATENT AND TRADEMARK OFFICE
CERTIFICATE OF CORRECTION

PATENT NO. : 11,817,899 B2
APPLICATION NO. : 17/641260
DATED : November 14, 2023
INVENTOR(S) : Berner et al.

It is certified that error appears in the above-identified patent and that said Letters Patent is hereby corrected as shown below:

In the Specification

Column 18, Lines 11-12: Please delete the paragraph break between "therebetween." and "The first"

Column 26, Lines 64-65: Please delete the paragraph break between "combiner." and "Summing"

Column 30, Line 51: Please correct "f2-f1=B+A, where A" to read --f2-f1=B+$\Delta$, where $\Delta$--

In the Claims

Column 38, Line 9, Claim 19: Please correct "signal data" to read --signal so that data--

Signed and Sealed this
Thirteenth Day of February, 2024

Katherine Kelly Vidal
*Director of the United States Patent and Trademark Office*